US011498520B2

(12) United States Patent
Stitt

(10) Patent No.: US 11,498,520 B2
(45) Date of Patent: Nov. 15, 2022

(54) ANTENNA SWITCHING CONTROL FOR AOA CAPTURING IN PHONE-AS-A-KEY SYSTEMS WITH DE-WHITENED TONE TRANSMISSION, CRC BASED VALIDATION AND EVENT TIMING

(71) Applicants: DENSO International America, Inc., Southfield, MI (US); DENSO CORPORATION, Kariya (JP)

(72) Inventor: Raymond Michael Stitt, Ada, MI (US)

(73) Assignees: DENSO International America, Inc., Southfield, MI (US); DENSO CORPORATION, Kariya (JP)

(*) Notice: Subject to any disclaimer, the term of this patent is extended or adjusted under 35 U.S.C. 154(b) by 0 days.

(21) Appl. No.: 17/007,152

(22) Filed: Aug. 31, 2020

(65) Prior Publication Data
US 2021/0078536 A1 Mar. 18, 2021

Related U.S. Application Data

(60) Provisional application No. 62/902,844, filed on Sep. 19, 2019, provisional application No. 62/900,114, filed on Sep. 13, 2019.

(51) Int. Cl.
*B60R 25/24* (2013.01)
*H04W 4/20* (2018.01)
(Continued)

(52) U.S. Cl.
CPC ............. *B60R 25/245* (2013.01); *G01S 3/46* (2013.01); *G06K 7/10366* (2013.01); *G07C 9/29* (2020.01);
(Continued)

(58) Field of Classification Search
CPC ........ B60R 25/245; B60R 25/01; H04W 4/20; H04W 4/40; H04W 12/63; H04W 12/106;
(Continued)

(56) References Cited

U.S. PATENT DOCUMENTS 9,688,247 B1 6/2017 Jayaraman et al.
9,794,753 B1 10/2017 Stitt et al.
(Continued)

FOREIGN PATENT DOCUMENTS

BR 102014017465 A2 2/2016
CN 104574593 A 4/2015
(Continued)

*Primary Examiner* — Vernal U Brown
(74) *Attorney, Agent, or Firm* — Harness, Dickey & Pierce, P.L.C.

(57) ABSTRACT

A reader includes a transceiver and a control module. The transceiver is configured to, during a current connection event, monitor notification messages transmitted from a portable access device to a phone-as-a-key (PaaK) system of a vehicle, where the notification messages are transmitted to establish a communication link between the portable access device and the PaaK system. The control module is configured to: perform an in-phase and quadrature phase capture of the notification messages based on fields in one or more of the notification messages, where the fields include a mobile de-whitened section including two or more series of consecutive bits, where the consecutive bits in each of the one or more series are all zeros or all ones; based on the in-phase and quadrature phase capture, determine an angle-of-arrival of the notification messages, and indicate the angle-of-arrival to the PaaK system for permitted access determined by the PaaK system.

25 Claims, 27 Drawing Sheets

(51) Int. Cl.
*H04W 4/40* (2018.01)
*H01Q 3/24* (2006.01)
*G01S 3/46* (2006.01)
*G07C 9/29* (2020.01)
*H04L 9/40* (2022.01)
*G06K 7/10* (2006.01)
*B60R 25/01* (2013.01)

(52) U.S. Cl.
CPC ........... *H01Q 3/24* (2013.01); *H04L 63/1466* (2013.01); *H04W 4/20* (2013.01); *H04W 4/40* (2018.02); *B60R 25/01* (2013.01)

(58) Field of Classification Search
CPC ................. G01S 3/46; G06K 7/10366; G07C 2009/00769
See application file for complete search history.

(56) References Cited

U.S. PATENT DOCUMENTS

| | | | |
|---|---|---|---|
| 9,894,492 | B1 | 2/2018 | Elangovan et al. |
| 10,002,479 | B2 | 6/2018 | Oz et al. |
| 10,244,476 | B2 | 3/2019 | Elangovan et al. |
| 10,328,898 | B2 | 6/2019 | Golsch et al. |
| 10,328,899 | B2 | 6/2019 | Golsch |
| 10,328,900 | B1 | 6/2019 | Yakovenko et al. |
| 2011/0151781 | A1* | 6/2011 | Kainulainen ............. G01S 3/16 455/41.2 |
| 2011/0215921 | A1 | 9/2011 | Ben Ayed et al. |
| 2012/0045058 | A1 | 2/2012 | Weghaus |
| 2014/0274013 | A1 | 9/2014 | Santavicca |
| 2015/0148989 | A1 | 5/2015 | Cooper et al. |
| 2015/0161832 | A1 | 6/2015 | Esselink et al. |
| 2015/0310681 | A1 | 10/2015 | Avery et al. |
| 2015/0356797 | A1 | 12/2015 | McBride et al. |
| 2016/0150407 | A1 | 5/2016 | Michaud et al. |
| 2017/0062938 | A1 | 3/2017 | Cheng et al. |
| 2017/0104589 | A1 | 4/2017 | Lambert et al. |
| 2017/0132533 | A1 | 5/2017 | Darnell et al. |
| 2017/0309098 | A1 | 10/2017 | Watters et al. |
| 2017/0330402 | A1 | 11/2017 | Menard et al. |
| 2018/0029560 | A1 | 2/2018 | Mohaupt et al. |
| 2018/0099643 | A1 | 4/2018 | Golsch et al. |
| 2018/0103414 | A1 | 4/2018 | Golsch |
| 2018/0126952 | A1 | 5/2018 | Niemiec |
| 2018/0154865 | A1 | 6/2018 | Bianchi, III et al. |
| 2018/0269565 | A1 | 9/2018 | Guthrie et al. |
| 2018/0299531 | A1* | 10/2018 | Hiscock ................ H04L 5/0044 |
| 2020/0014099 | A1* | 1/2020 | Ghabra .................... H01Q 1/38 |
| 2020/0257282 | A1* | 8/2020 | Lavoie ................. B60W 60/00 |

FOREIGN PATENT DOCUMENTS

| | | |
|---|---|---|
| WO | WO-16156682 A1 | 10/2016 |
| WO | WO-2017181050 A1 | 10/2017 |
| WO | WO-18040641 A1 | 3/2018 |

* cited by examiner

ANTENNA SWITCHING CONTROL FOR AOA CAPTURING IN PHONE-AS-A-KEY SYSTEMS WITH DE-WHITENED TONE TRANSMISSION, CRC BASED VALIDATION AND EVENT TIMING

CROSS-REFERENCE TO RELATED APPLICATIONS

This application claims the benefit of U.S. Provisional Application No. 62/900,114 filed on Sep. 13, 2019 and U.S. Provisional Application No. 62/902,844 filed on Sep. 19, 2019. The entire disclosures of the above applications are incorporated herein by reference.

FIELD

The present disclosure relates to systems and methods for establishing a secure communication link between a portable access device and a vehicle.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Traditionally, a passive entry/passive start (PEPS) system is able to perform keyless entry by allowing a user in possession of a key fob, which has been paired with a central PEPS electronic control unit (ECU) of a vehicle, to gain access to the vehicle. The user may simply grab a door handle of the vehicle and start the vehicle with a push of a button. In response to the button being pushed, the central PEPS ECU performs an authentication process to determine if the key fob is authorized to access the vehicle. Strengths of signals received via multiple vehicle antennas may be monitored to estimate the location of the key fob relative to the vehicle. If the key fob is authenticated and is located within a predetermined range of the vehicle, vehicle access functions are made available to the user (e.g., the unlocking of doors, starting of the vehicle, setting temperature within the vehicle, etc.).

Traditionally, PEPS systems use proprietary grade radio protocols including transmission of low frequency (LF) signals at approximately 125 kHz. These types of PEPS systems are limited by physics associated with transmitting LF signals. Wave propagation of LF signals allow for accurate estimation of range and location of a key fob. This is accomplished, for example, by monitoring signal strength within a target activation range of 2 meters. However, due to a long wavelength of a LF signal and practical sizes of a vehicle antenna and key fob receiver, it is difficult within reasonable power consumption and safe transmit power levels to reliably communicate beyond a few meters with a key fob using LF. Consequently, it is also difficult to make vehicle access functions available to the user when the key fob is located more than a few meters away from the vehicle.

Accordingly, smart devices (e.g., smart phones and wearable devices) are being used instead of key fobs to gain access to vehicle functions. Smart devices communicate at high radio frequencies (RFs) and thus are able to communicate over longer distances than LF systems. As such, smart devices allow various vehicle functions and long range distancing features to be implemented, such as passive welcome lighting and distance bounding on remote parking applications.

PEPS systems using LF access devices and PEPS systems using RF access devices have wireless vulnerabilities that subject the respective PEPS systems to malicious attacks. As an example, a user may attack a PEPS system by passive eavesdropping, performing a man-in-the-middle (MITM) attack, performing a replay attack, and/or performing identity tracking of various telemetric links of the PEPS system.

SUMMARY

This section provides a general summary of the disclosure, and is not a comprehensive disclosure of its full scope or all of its features.

A portable access device for wirelessly gaining access to a vehicle is provided. The portable access device includes a transceiver, receive and transmit queues, and a control module. The transceiver is configured to, during a current connection event, receive first notification messages from a phone-as-a-key (PaaK) system of the vehicle and in response thereto transmit second notification messages to the PaaK system. The first notification messages and the second notification message are transmitted to establish a communication link between the portable access device and the PaaK system. The receive queue is configured to receive the first notification messages. The transmit queue is configured to store the second notification messages. The control module is configured to generate and store the second notification messages in the transmit queue in response to receiving the first notification messages from the receive queue. The control module is configured to, based on a first one of the first notification messages, (i) determine what data was transmitted during a last connection event prior to the current connection event, and (ii) generate one or more of the second notification messages to include data not previously received during the last connection event.

In other features, the second notification messages are associated with one or more frames in a frame sequence. The first one of the first notification messages indicates at least one of characteristics transmitted by the portable access device during the last connection event, channel attempts performed by the portable access device during the last connection event, or where the portable access device is in the frame sequence. The control module generate one or more of the second notification messages to include data not previously received during the last connection event based on the at least one of characteristics transmitted by the portable access device during the last connection event, channel attempts performed by the portable access device during the last connection event, or where the portable access device is in the frame sequence.

In other features, the second notification messages are associated with one or more frames in a frame sequence. The first one of the first notification messages indicates characteristics transmitted by the portable access device during the last connection event, channel attempts performed by the portable access device during the last connection event, and where the portable access device is in the frame sequence. The control module is configured to generate the one or more of the second notification messages based on the characteristics, channel attempts, and where the portable access device is in the frame sequence.

In other features, the first notification messages and the second notification messages are transmitted as 2.4 GHz radio frequency signals.

In other features, the control module is configured to, during the current connection event, limit at least one of (i) a number of characteristics stored in the transmit queue and transmitted to the PaaK system, or (ii) a number of protocol data units stored in the transmit queue and transmitted to the PaaK system. The second notification messages include the characteristics and the protocol data units.

In other features, the control module is configured to: based on one of the first notification messages from the PaaK system, determine that a receive queue of the PaaK system is filling up; and reduce a number of notification messages transmitted from the portable access device to the PaaK system during a connection event subsequent to the current connection event.

In other features, the control module is configured to reduce the number of notification messages transmitted from the portable access device to the PaaK system during the connection event subsequent to the current connection event to maintain a lag in a corresponding control loop to two connection events.

In other features, the control module is configured to generate de-whitened packets to include in some of the second notification messages. The de-whitened packets are generated based on an indication of the current connection event and an indication of a current channel over which the portable access device is transmitting the second notification messages to the PaaK system.

In other features, the control module is configured to generate some of the second notification messages to each include a mobile de-whitened section including a predetermined number of series of consecutive bits. Each of the series of consecutive bits includes all zeros or all ones.

In other features, the predetermined number of series of consecutive bits includes 2-10 series of consecutive bits, where each of the series of consecutive bits includes 12-32 bits.

In other features, the transceiver is configured to receive a connection event information score from the PaaK system indicating whether the portable access device is ahead, centered or behind in transmitting the second notification messages to the PaaK system. The control module is configured to adjust a fill rate of the transmit queue based on the connection event information score.

In other features, a PaaK system for a vehicle is provided. The PaaK system includes a transceiver, a receive queue, a transmit queue and a PaaK module. The transceiver is configured to, during a current connection event, transmit first notification messages to a portable access device and in response thereto receive second notification messages from the portable access device. The second notification messages are associated with one or more frames in a frame sequence. The first notification messages and the second notification message are transmitted to establish a communication link between the portable access device and the PaaK system. The receive queue is configured to receive the second notification messages. The transmit queue configured to store the first notification messages. The PaaK module is configured to generate and store the first notification messages in the transmit queue and generate a first one of the first notification messages to indicate the aspects including at least one of characteristics transmitted by the portable access device during the last connection event, channel attempts performed by the portable access device during the last connection event, or where the portable access device is in the frame sequence.

In other features, the transceiver, the receive queue, the transmit queue, and the PaaK module are implemented as a PaaK device.

In other features, the PaaK module is configured to generate the first one of the first notification messages to indicate: the characteristics transmitted by the portable access device during the last connection event; the channel attempts performed by the portable access device during the last connection event; and where the portable access device is in the frame sequence.

In other features, the PaaK module is configured to: determine what data was received by the PaaK system from the portable access device during the last connection event; and indicate in the first one of the first notification messages what data was received from the portable access device.

In other features, the PaaK system further includes: a tone remover module configured to remove at least one of mobile de-whitened tones or mobile de-whitened sections from the second notification messages; and a validation module configured to determine whether bytes of remaining portions of the second notification messages are valid.

In other features, the PaaK module is configured to limit at least one of a number of non-empty protocol data units stored in the transmit queue or transmitted to the portable access device during the current connection event; and the first notification messages include the non-empty protocol data units.

In other features, the PaaK module is configured to: determine whether the receive queue is filling up; and based on a fill level of the receive queue, indicate in one of the first notification messages a status of the receive queue to cause the portable access device to reduce a number of notification messages the portable access device transmits to the PaaK system during a connection event subsequent to the current connection event.

In other features, the PaaK module is configured to indicate to the portable access device the current connection event and a current channel over which the PaaK system is communicating with the portable access device for generation of de-whitened packets by the portable access device. The second notification messages include the de-whitened packets. In other features, the PaaK module is configured to: generate a connection event information score indicating whether the portable access device is ahead, centered or behind in transmitting the second notification messages to the PaaK module; and store the connection event information score in the transmit queue. The transceiver is configured to transmit the connection event information score to the portable access device.

In other features, a reader is provided and includes a transceiver and a control module. The transceiver is configured to, during a current connection event, monitor notification messages transmitted from a portable access device to a phone-as-a-key (PaaK) system of a vehicle, where the notification messages are transmitted to establish a communication link between the portable access device and the PaaK system. The control module is configured to: perform an in-phase and quadrature phase capture of the notification messages based on fields in one or more of the notification messages, where the fields include a mobile de-whitened section including two or more series of consecutive bits, where the consecutive bits in each of the one or more series are all zeros or all ones; based on the in-phase and quadrature phase capture, determine an angle-of-arrival of the notification messages, and indicate the angle-of-arrival to the PaaK system for permitted access determined by the PaaK system.

In other features, the fields include an access address, a logical link identifier, a logical link header, a channel identifier, a generic attribute profile opcode, and an attribute handle.

In other features, the control module is configured to determine whether to perform the in-phase and quadrature phase capture based on the access address, the logical link identifier, the logical link header, the channel identifier, the generic attribute profile opcode, and the attribute handle.

In other features, the angle-of-arrival is relative to at least one of the reader or a reference point on the vehicle.

In other features, the control module is configured to control the transceiver to perform antenna switching, while determining the angle-of-arrival of the notification messages, based on transmission start and end times of the one or more series of consecutive bits.

In other features, the control module is configured to, while determining the angle-of-arrival of the notification messages, control the transceiver to switch between antennas at (i) a transmission start time of the one or more series of consecutive bits or (ii) a transmission end time of the one or more series of consecutive bits.

In other features, the control module is configured to perform a cyclical redundancy check on the notification messages based on a pre-known de-whitened value.

In other features, the transceiver does not perform antenna switching while the control module determines the angle-of-arrival of the notification messages.

In other features, the control module is configured to perform a cyclical redundancy check on the notification messages and indicate results of the cyclical redundancy check to the PaaK system.

In other features, the control module is configured to control the transceiver to perform antenna switching while determining the angle-of-arrival and while a characteristic is being transmitted from the portable access device to the PaaK system.

In other features, a first one of the notification messages does not include a mobile de-whitened section and other ones of the notification messages include mobile de-whitened sections. The control module is configured to determine a received signal strength indicator value based on the first one of the notification message and indicate the received signal strength indicator to the PaaK system.

In other features, a phone-as-a-key (PaaK) system is provided and includes a transceiver and a PaaK module. The transceiver is configured to, during a current connection event, receive notification messages transmitted from a portable access device, where the notification messages are transmitted to establish a communication link between the portable access device and the PaaK system and gain access to a vehicle, where one or more of the notification messages include fields, where the fields of each of the one or more notification messages include a mobile de-whitened section including two or more series of consecutive bits, and where the bits in each of the one or more series are all zeros or all ones. The PaaK module is configured to: remove the mobile de-whitened section from each of the one or more notification messages; determine whether the notification messages are valid; when the notifications messages are valid, establishing a link with the portable access device; receive angle-of-arrival information from a reader separate from the PaaK system, where the angle-of-arrival information indicates an angle-of-arrival of the notification messages relative to at least one of the reader or a reference point on the vehicle; and providing access to the vehicle to the portable access device based on the angle-of-arrival information.

In other features, the reader performs antenna switching while determining the angle-of-arrival information.

In other features, the reader does not perform antenna switching while determining the angle-of-arrival information.

In other features, the PaaK module is configured to determine whether the notification messages are valid based on a cyclical redundancy check performed by the reader.

In other features, the PaaK module is configured to determine whether the notification messages are valid based on a cyclical redundancy check performed by the PaaK module.

In other features, a first one of the notification messages does not include a mobile de-whitened section and other ones of the notification messages include mobile de-whitened sections. The PaaK module is configured to determine whether one or more of the notification messages are valid based on a received signal strength indicator value received from the reader based on a first one of the notification messages.

In other features, the notification messages are second notification messages. The PaaK module is configured to generate first notification messages and receive the second notification messages from the portable access device in response to the first notification messages. A first one of the first notification messages is a status message and other ones of the first notification messages are empty protocol data unit messages. The first one of the second notification messages is a status message and other ones of the second notification messages are mobile de-whitened messages.

In other features, the PaaK module is configured to indicate to the portable access device whether the portable access device is ahead or behind relative to a channel and connection event the portable access device is targeting.

In other features, the PaaK module is configured to determine (i) when the current connection event starts and stops, (ii) a channel hop sequence of the portable access device, (iii) a frame sequence of the portable access device, (iv) and when the portable access device transmits characteristics, and based thereon control filling a transmit queue of the PaaK system and signal the portable access device to adjust a fill rate of a transmit queue of the portable access device.

In other features, a method is provided for establishing a communication link between (i) a portable access device that includes a processor that is configured to execute instructions stored in a non-transitory computer-readable medium and (ii) a peripheral device is disclosed. The method includes generating, using the processor of the portable access device: first message authentication code (MAC) bytes based on a shared secret key; first nonce bytes; an authenticated packet based on the first MAC bytes, the first nonce bytes, and a message byte; a de-whitened tone byte based on the shared secret key; and a message packet that includes the authenticated packet and the de-whitened tone byte. Generating the message packet includes: pseudo-randomly identifying a first location of the authenticated packet; and inserting the de-whitened tone byte at the first location; transmitting, using the processor of the portable access device, the message packet to the peripheral device; and establishing, using the processor of the portable access device, the communication link between the portable access device and the peripheral device in response to the peripheral device validating the message packet.

In some configurations, the method includes generating, using a processor of the peripheral device, second MAC bytes based on the shared secret key, where the processor of the peripheral device is configured to execute instructions stored in a non-transitory computer-readable medium. The method also includes generating, using the processor of the peripheral device, second nonce bytes.

In some configurations, validating the message packet includes removing, using the processor of the peripheral device, the de-whitened tone byte from the message packet. Validating the message packet also includes determining, using the processor of the peripheral device, that the message packet is authorized in response to the processor of the peripheral device determining that the first MAC bytes match the second MAC bytes.

In some configurations, validating the message packet includes determining, using the processor of the peripheral device, that the message packet is authorized in response to the processor of the peripheral device determining that the first nonce bytes match the second nonce bytes.

In some configurations, the method further comprises determining the message packet is invalid in response to one of: (i) determining, using the processor of the peripheral device, that the first MAC bytes do not match the second MAC bytes; and (ii) determining, using the processor of the peripheral device, that the first nonce bytes do not match the second nonce bytes.

In some configurations, the first nonce bytes are generated using a random number generator.

In some configurations, the first location is between a first MAC bit of the first MAC bytes and a second MAC bit of the first MAC bytes.

In some configurations, the first location is between a first nonce bit of the first nonce bytes and a second nonce bit of the first nonce bytes.

In some configurations, the first location precedes a location of one of the first nonce bytes and the first MAC bytes.

In some configurations, a location of the first nonce bytes and a location of the first MAC bytes precede the first location.

The present disclosure also provides a system that comprises a portable access device that includes a processor configured to execute instructions stored in a non-transitory computer-readable medium. The instructions include generating, using the processor of the portable access device: first message authentication code (MAC) bytes based on a shared secret key; first nonce bytes; an authenticated packet based on the first MAC bytes, the first nonce bytes, and a message byte; a de-whitened tone byte based on the shared secret key; and a message packet that includes the authenticated packet and the de-whitened tone byte. Generating the message packet includes: pseudo-randomly identifying a first location of the authenticated packet; and inserting the de-whitened tone byte at the first location; transmitting, using the processor of the portable access device, the message packet to the peripheral device; and establishing, using the processor of the portable access device, the communication link between the portable access device and the peripheral device in response to the peripheral device validating the message packet.

In some configurations, the peripheral device includes a processor configured to execute second instructions stored in a second non-transitory computer-readable medium. The second instructions include generating, using the processor of the peripheral device, second MAC bytes based on the shared secret key. The second instructions also include generating, using the processor of the peripheral device, second nonce bytes.

In some configurations, validating the message packet includes removing, using the processor of the peripheral device, the de-whitened tone byte from the message packet. Validating the message packet also includes determining, using the processor of the peripheral device, that the message packet is authorized in response to the processor of the peripheral device determining that the first MAC bytes match the second MAC bytes.

In some configurations, validating the message packet includes determining, using the processor of the peripheral device, that the message packet is authorized in response to the processor of the peripheral device determining that the first nonce bytes match the second nonce bytes.

In some configurations, the instructions include determining the message packet is invalid in response to one of: (i) determining, using the processor of the peripheral device, that the first MAC bytes do not match the second MAC bytes; and (ii) determining, using the processor of the peripheral device, that the first nonce bytes do not match the second nonce bytes.

In some configurations, the first nonce bytes are generated using a random number generator.

In some configurations, the first location is between a first MAC bit of the first MAC bytes and a second MAC bit of the first MAC bytes.

In some configurations, the first location is between a first nonce bit of the first nonce bytes and a second nonce bit of the first nonce bytes.

In some configurations, the first location precedes a location of one of the first nonce bytes and the first MAC bytes.

In some configurations, a location of the first nonce bytes and a location of the first MAC bytes precede the first location.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

The present disclosure relates to systems, methods, and architecture to implement a localization system, such as a PEPS system, using a consumer grade wireless protocol. Specifically, the present disclosure relates to a PEPS system using a wireless communication protocol, such as a Bluetooth® Low Energy (BLE) communication protocol, for communication between a vehicle and a portable access device, such as a smartphone or a wearable device. The PEPS system includes a sensor network that is configured to find existing connections between the portable access device and the vehicle and to measure timing and signal characteristics of the communication between the portable access device and the vehicle. Based on the timing and signal characteristics, a PaaK module may determine the distance between the portable access device and the vehicle and location of the portable access device. The PEPS system is also configured to perform a cryptographic operation to prevent an unauthorized device from executing a replay attack on the communication link between the vehicle and the portable access device. The examples set forth herein further include queueing techniques, timing techniques, de-whitened packet generation techniques, message replacement techniques, cyclical redundancy check (CRC) validation based techniques, and angle-of-arrival and antenna switching based techniques.

Figure 1:
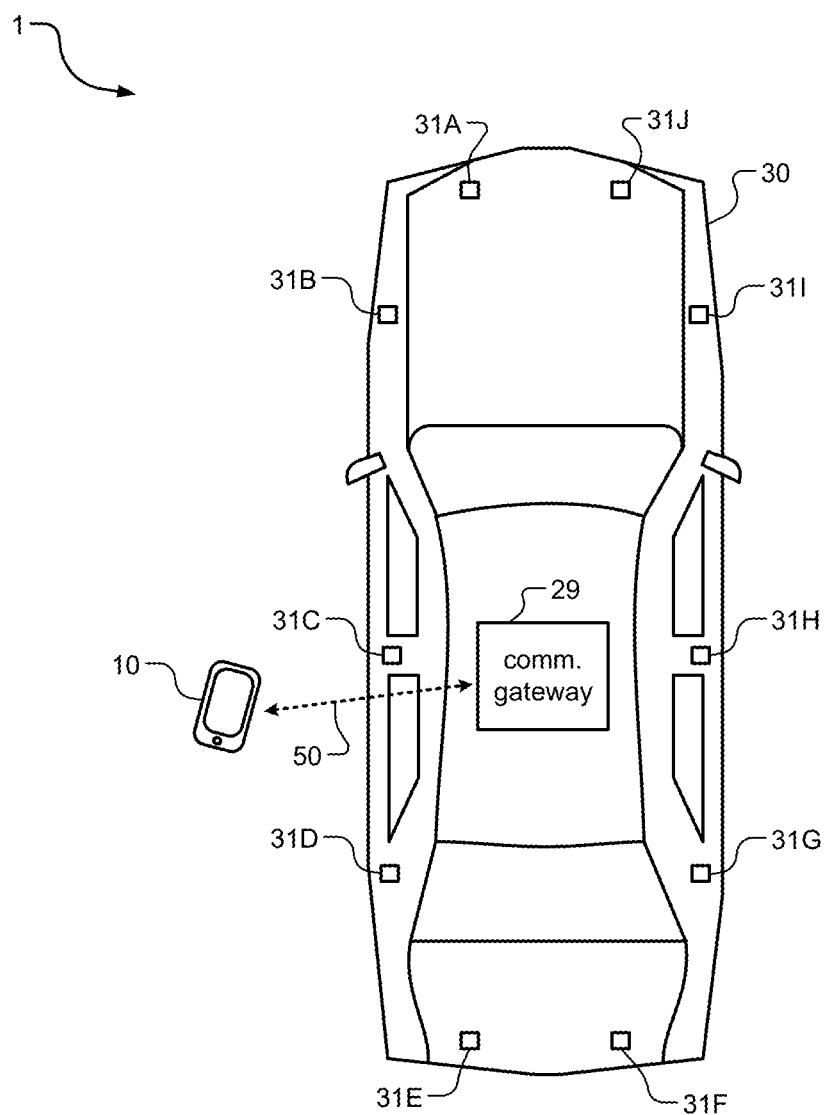
FIG. 1 is a top view of a vehicle and a portable access device in accordance with the present disclosure.
Figure 2:
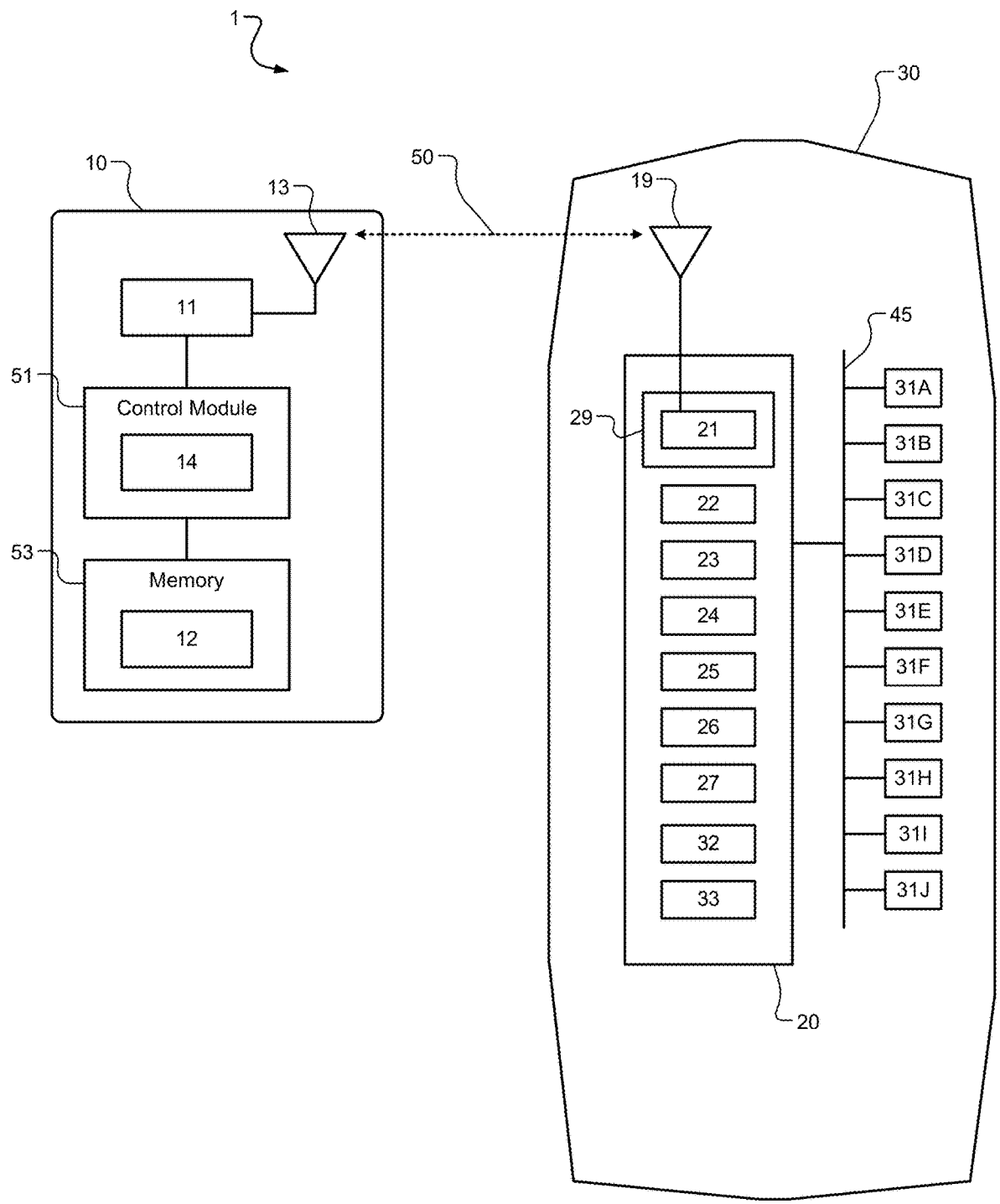
FIG. 2 is a functional block diagram of a vehicle and a portable access device in accordance with the present disclosure.

FIGS. 1-2 show a PEPS system 1 within a vehicle 30 and includes a communication gateway 29, sensors 31A-31J (collectively referred to as sensors 31), and a control module 20. While FIGS. 1-2 illustrate ten sensors 31A-31J, any number of sensors may be used. Furthermore, while FIG. 2 illustrates one control module 20, the PEPS system 1 may include one or more control modules 20 that are distributed throughout the vehicle 30.

The one or more control modules 20 and the sensors 31 may communicate with each other using a vehicle interface 45. As an example, the vehicle interface 45 may include a controller area network (CAN) bus for communication between modules. As another example, the vehicle interface 45 may include a local interconnect network (LIN) for low data rate communication. In other embodiments, the vehicle interface 45 may include a clock extension peripheral interface (CXPI) bus. Additionally or alternatively, the vehicle interface 45 may include any combination of the CAN bus, a LIN, and CXPI bus communication interfaces.

Figure 3:
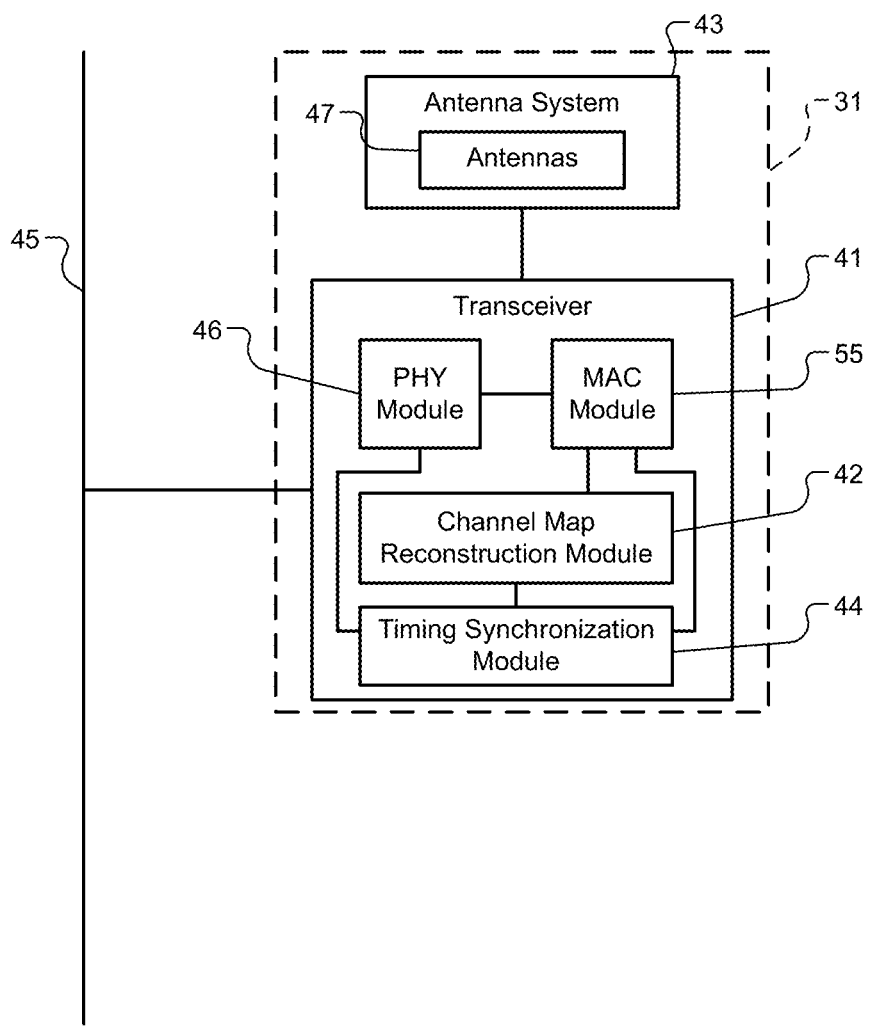
FIG. 3 is a functional block diagram of a sensor of a vehicle in accordance with the present disclosure.
Figure 21:
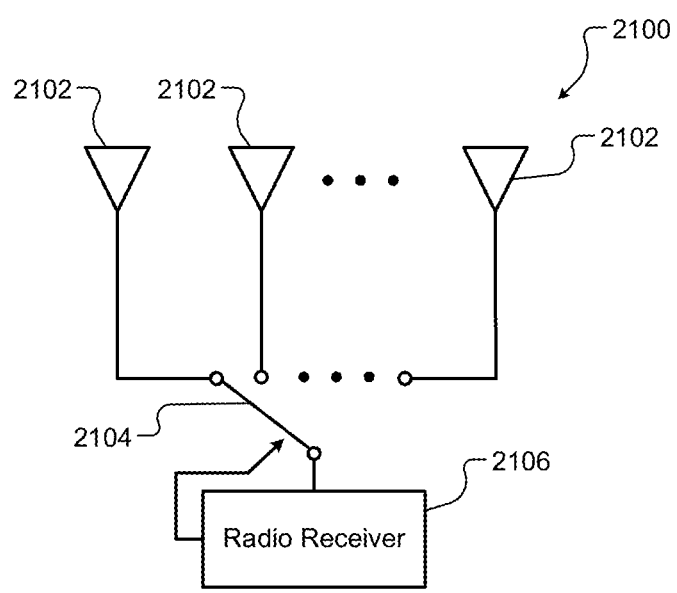
FIG. 21 is a functional block diagram of an antenna system in accordance with the present disclosure.

The control module 20 may include the communication gateway 29, which includes a wireless communication chipset (or transceiver) 21 connected to one or more antennas 19 (multiple antennas are shown in FIGS. 3 and 21). For example, the transceiver 21 may include a Bluetooth® low energy (BLE) communication chipset that utilizes the BLE communication protocol. Alternatively, other wireless communication protocols, such as wireless fidelity (Wi-Fi) or Wi-Fi direct, may be used. As shown in FIG. 2, the antennas 19 may be located in the vehicle 30. Alternatively, the antennas 19 may be located outside of the vehicle 30 or within the control module 20. The control module 20 may also include a link authentication module 22 that authenticates a portable access device 10 for communication via communication link 50. As an example, the link authentication module 22 may be configured to execute challenge-response authentication or other cryptographic verification algorithms in order to authenticate the portable access device 10.

The control module 20 may also include a data management layer module 23 for push data. As an example, the data management layer module 23 is configured to obtain vehicle information obtained by any of the modules (e.g., location information obtained by a telematics module 26) and transmit the vehicle information to the portable access device 10.

The control module 20 may also include a connection information distribution module 24 that is configured to obtain information corresponding to communication channels and channel switching parameters of a communication link 50 and transmit the information to the sensors 31. In response to the sensors 31 receiving the information from the connection information distribution module 24 via the vehicle interface 45 and the sensors 31 being synchronized with the communication gateway 29, the sensors 31 may locate, follow, and/or eavesdrop on the communication link 50.

The control module 20 may also include a timing control module 25, which obtains timing information corresponding to the communication link 50 when the link authentication module 22 executes a challenge-response authentication process. The timing control module 25 is also configured to provide the timing information to the sensors 31 via the vehicle interface 45.

The control module 20 may also include the telematics module 26, which is configured to generate location information and/or an error of the location information associated with the vehicle 30. The telematics module 26 may be implemented by a global navigation satellite system (e.g., GPS), inertial navigation system, global system for mobile communication (GSM) system, and/or other location system.

The control module 20 may also include a security filtering module 33 that is configured to detect violations of the physical layer and protocol and filter the data accordingly before providing the information to a sensor processing and localization module 32. The security filtering module 33 may also be configured to flag data as injected such that the sensor processing and localization module 32 may discard the flagged data and alert the PEPS system 1. The data from the sensor processing and localization module 32 is provided to a PEPS module 27, which is configured to (i) read vehicle state information from the sensors 31 in order to detect user intent to access a vehicle function, and (ii) compare the location of the portable access device 10 to the set of locations that authorize certain functions, such as unlocking a door of the vehicle 30 and/or starting the vehicle 30.

In order to carry out the above functionality of the various modules described above, the control module 20 may also include one or more processors that are configured to execute instructions stored in a non-transitory computer-readable medium, such as a read-only memory (ROM) and/or random access memory (RAM).

As shown in FIGS. 1-2, the portable access device 10 may communicate with the communication gateway 29 of the vehicle 30 via the communication link 50. Without limitation, the portable access device 10 may be, for example, any Bluetooth®-enabled communication device, such as a smart phone, smart watch, wearable electronic device, key fob, tablet device, Bluetooth® transmitter device, or other device associated with a user of the vehicle 30, such as an owner, driver, passenger of the vehicle 30, and/or a technician for the vehicle 30. Additionally or alternatively, the portable access device 10 may be configured for wireless communication via another wireless communication protocol, such as Wi-Fi and/or Wi-Fi direct. The communication link 50 may be a Bluetooth® communication link as provided for and defined by the Bluetooth® specification. As an example, the communication link 50 may be a BLE communication link. Alternatively, the communication link 50 may be a Wi-Fi or Wi-Fi direct communication link.

The portable access device 10 may include a wireless communication chipset (or transceiver) 11 connected to an antenna 13. The transceiver 11 may be a BLE communication chipset. Alternatively, the transceiver 11 may be a Wi-Fi or Wi-Fi direct communication chipset. The portable access device 10 may also include a control module 51 and a memory 53. The memory 53 stores an application code 12 that is executable by a processor of the control module 51 and stored in a non-transitory computer-readable medium, such as a read-only memory (ROM) or a random-access memory (RAM). Based on the application code 12 and using the wireless communication chipset 11 and the antenna 13, the portable access device 10 may be configured to execute various instructions corresponding to, for example, authentication of the communication link 50, transmission of location and/or velocity information obtained by a global navigation satellite system (e.g., GPS) sensor or accelerometer of the portable access device 10, and manual activation of a vehicle function.

The portable access device 10 may also include a cryptographic verification module (CVM) 14, which may be implemented by application code that is executable by the processor of the control module 51 and stored in a non-transitory computer-readable medium, such as a read-only memory (ROM) or a random-access memory (RAM). The CVM 14 is described in further detail below.

With reference to FIG. 3, each of the sensors 31 of FIG. 1 may include a wireless communication chipset (or transceiver) 41 connected to an antenna system 43. The transceiver 41 may be a BLE communication chipset. Alternatively, the transceiver 41 may be a Wi-Fi or Wi-Fi direct communication chipset. As shown in FIG. 3, the antenna system 43 may be located internal or external to the sensors 31 and may include one or more antennas and an antenna switch for selecting one of the antennas. An example antenna system is shown in FIG. 21. The antenna system of FIG. 21 may be implemented at one or more of the sensors 31 or in other devices disclosed herein, such as in the communication gateway 29 of FIGS. 1-2 and/or in one or more of the PaaK devices and the AoA readers of FIGS. 14 and 19.

With reference to FIG. 2, the control module 20 and, more specifically, the communication gateway 29, may establish a secure communication connection, such as communication link 50, with the portable access device 10. For example, the control module 20 may establish a secure communication connection using the BLE communication protocol. The control module 20 may then communicate information about the secure communication connection, such as timing and synchronization information, to each of the sensors 31. For example, the control module 20 may communicate information about the secure communication connection, such as: timing of the next communication connection event; a timing interval between communication connection events; a communication channel for a next communication connection event in a hop sequence; a channel map; a channel hop interval or offset, which may be used to calculate a channel for subsequent communication connection events; communication latency information; communication jitter information; etc. The sensors 31 may then eavesdrop on communication packets sent by the portable access device to the control module 20 and measure signal information of the signals received from the portable access device 10. For example, the sensors 31 may measure the received signal strength of each of the signals and determine respective received signal strength indicator (RSSI) values. Additionally or alternatively, the sensors 31 may determine other measurements of the signals received from the portable access device 10, such as an angle of arrival, a time of arrival, a time difference of arrival, etc.

The sensors 31 may then communicate the measured information to the control module 20, which may determine a location of the portable access device 10 or a distance to the portable access device 10 based on the measured information received from each of the sensors 31. For example, the control module 20 may determine the location of the portable access device 10 based on, for example, the patterns of the RSSI values for the various signals received from the portable access device 10 by the various sensors 31. For example, a relatively strong RSSI generally indicates that the portable access device 10 is closer and a relatively weak RSSI generally indicates that the portable access device 10 is farther away. By analyzing the RSSI for communication signals sent by the portable access device 10 with each of the sensors 31, the control module 20 may determine a location of or distance to the portable access device 10 relative to the vehicle 30. Additionally or alternatively, angle of arrival or time difference of arrival measurements for the signals sent by the portable access device 10 and received by the sensors 31 may also be used by the control module 20 to determine the location of the portable access device 10. Additionally or alternatively, the sensors 31 themselves may determine a location of the portable access device 10 or distance to the portable access device 10 based on the measured information and may communicate the location or distance to the control module 20.

Based on the determined location or distance of the portable access device 10 relative to the vehicle 30, the PEPS system 1 may then authorize or perform a vehicle function, such as unlocking a door of the vehicle 30, unlocking a trunk of the vehicle 30, starting the vehicle 30, and/or allowing the vehicle 30 to be started. For example, if the portable access device 10 is less than a first distance threshold to the vehicle 30, the PEPS system 1 may activate interior or exterior lights of the vehicle 30. If the portable access device 10 is less than a second distance threshold to the vehicle, the PEPS system 1 may unlock doors or a trunk of the vehicle 30. If the portable access device 10 is located inside of the vehicle 30, the PEPS system 1 may allow the vehicle 30 to be started.

With continued reference to FIG. 3, each of the sensors 31 may include the transceiver 49 that includes a physical layer (PHY) module 46, a medium access control (MAC) module 55, a channel map reconstruction module 42 and a timing synchronization module 44. When a BLE communication protocol is used, the sensor 31 receives BLE signals using the antenna system 43 and, specifically, receives BLE physical layer messages using the PHY module 46. The sensor 31 may be configured to observe BLE physical layer messages and obtain measurements of the physical properties of the associated signals, including, for example, a RSSI using a channel map that is produced by the channel map reconstruction module 42.

With reference to FIG. 2, the sensors 31 may communicate with each other and/or communicate with the communication gateway 29 via the vehicle interface 45 to determine time difference of arrival, time of arrival, or angle of arrival data for signals received by multiple sensors 31.

A timing synchronization module 44 is configured to accurately measure the reception times of messages on the vehicle interface 45 and pass the timing information to the transceiver 41. The transceiver 41 is configured to tune the PHY module 46 to a specific channel at a specific time based on the channel map information and the timing signals. Furthermore, when the BLE communication protocol is used, the transceiver 41 is configured to observe physical layer messages and data that conform to a Bluetooth® physical layer specification, which may include the data rates proposed or adopted in, for example, the Bluetooth® Specification version 5.0. The data, timestamps, and measured signal strength may be reported by the transceiver 41 to the various modules of the control module 20 via the vehicle interface 45.

Figure 4:
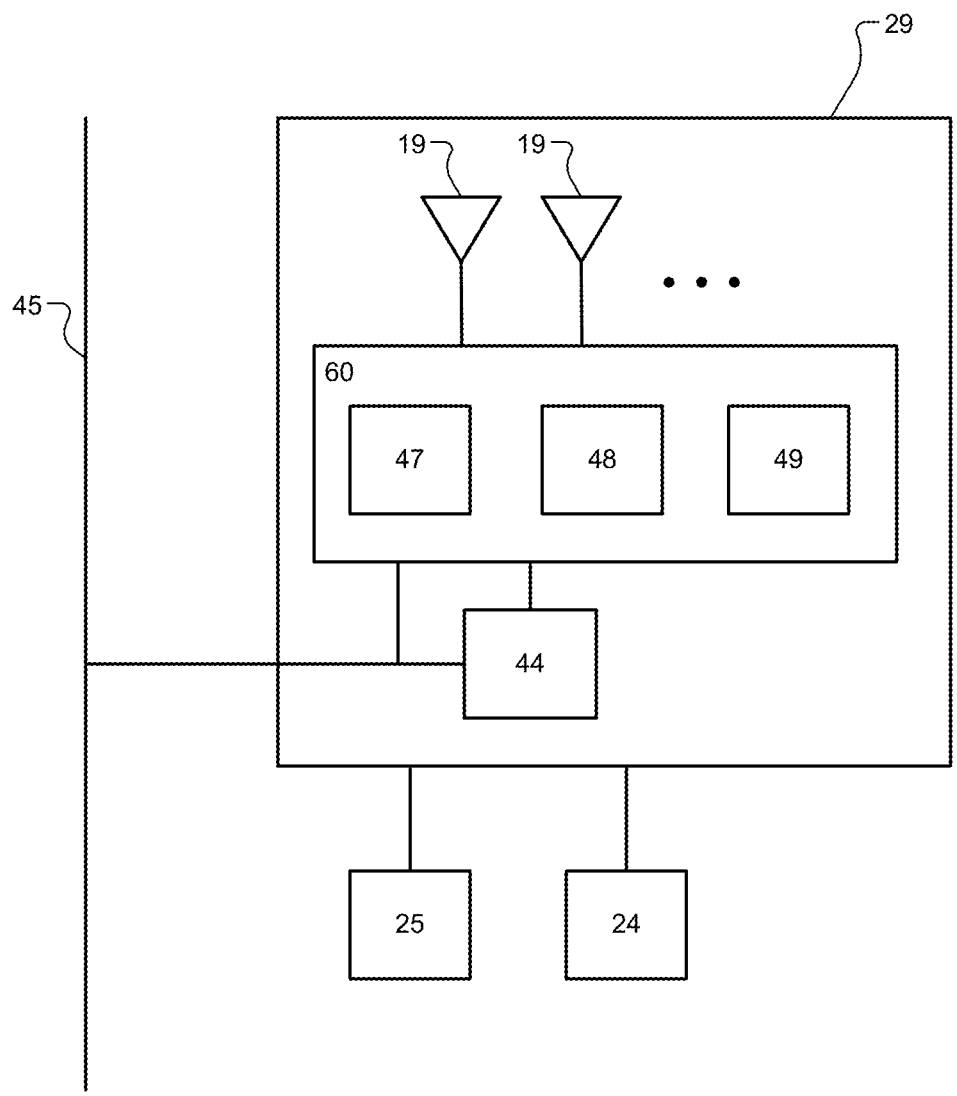
FIG. 4 is a functional block diagram of a communication gateway (or radio frequency (RF) antenna module) of a vehicle in accordance with the present disclosure.

With reference to FIG. 4, the communication gateway 29 includes a wireless communication chipset (or transceiver) 60 connected to one or more antennas 19 to receive BLE signals. When the BLE communication protocol is used, the transceiver 60 implements a Bluetooth® protocol stack, represented by box 48. The Bluetooth® protocol stack is compliant with a BLE specification, such as Bluetooth® Specification version 5.0. The transceiver 60 may also include execute an application 47 including application code that is executable by a processor of the transceiver 60 or a control module of the communication gateway 29. Additionally or alternatively, the application 47 may be executable by a processor of the control module 20 and may be stored in a non-transitory computer-readable medium of the control module 20.

The application 47 may include code corresponding to modifications outside of the Bluetooth® specification to enable the transceiver 60 to inspect timestamped data transmitted and received by the transceiver 60, regardless of the validity of the data. For example, the application 47 enables the transceiver 60 to compare transmitted and received data against expected data. The communication gateway 29 is configured to transmit the actual transmitted and received data to the various modules of the control module 20 via the vehicle interface 45. Alternatively, the communication gateway 29 may be configured to receive the data from each of the sensors 31 via the vehicle interface 45. The application 47 may be further configured to enable the transceiver 60 to confirm that each of the sensors 31 has received the correct data at the correct time.

The Bluetooth® protocol stack 48 is configured to provide the channel map, access identifier, next channel, and the time to the next channel to the application 47. The Bluetooth® protocol stack 48 is configured to output (i) timing signals for the timestamps of transmission and reception events to the module executing the application 47, and/or (ii) a digital PIN output of the transceiver 60. The timing synchronization module 44 is configured to accept the timing signals and operates in conjunction with the vehicle interface 45 to create accurate time stamps of connection information messages and other communications.

The communication gateway 29 may provide timing information and channel map information to the timing control module 25. The communication gateway 29 may be configured to provide information corresponding to ongoing connections to the connection information distribution module 24 and timing signals to the timing control modules 25 such that the sensors 31 may find and follow, or eavesdrop on, the communication link 50.

Figure 14:
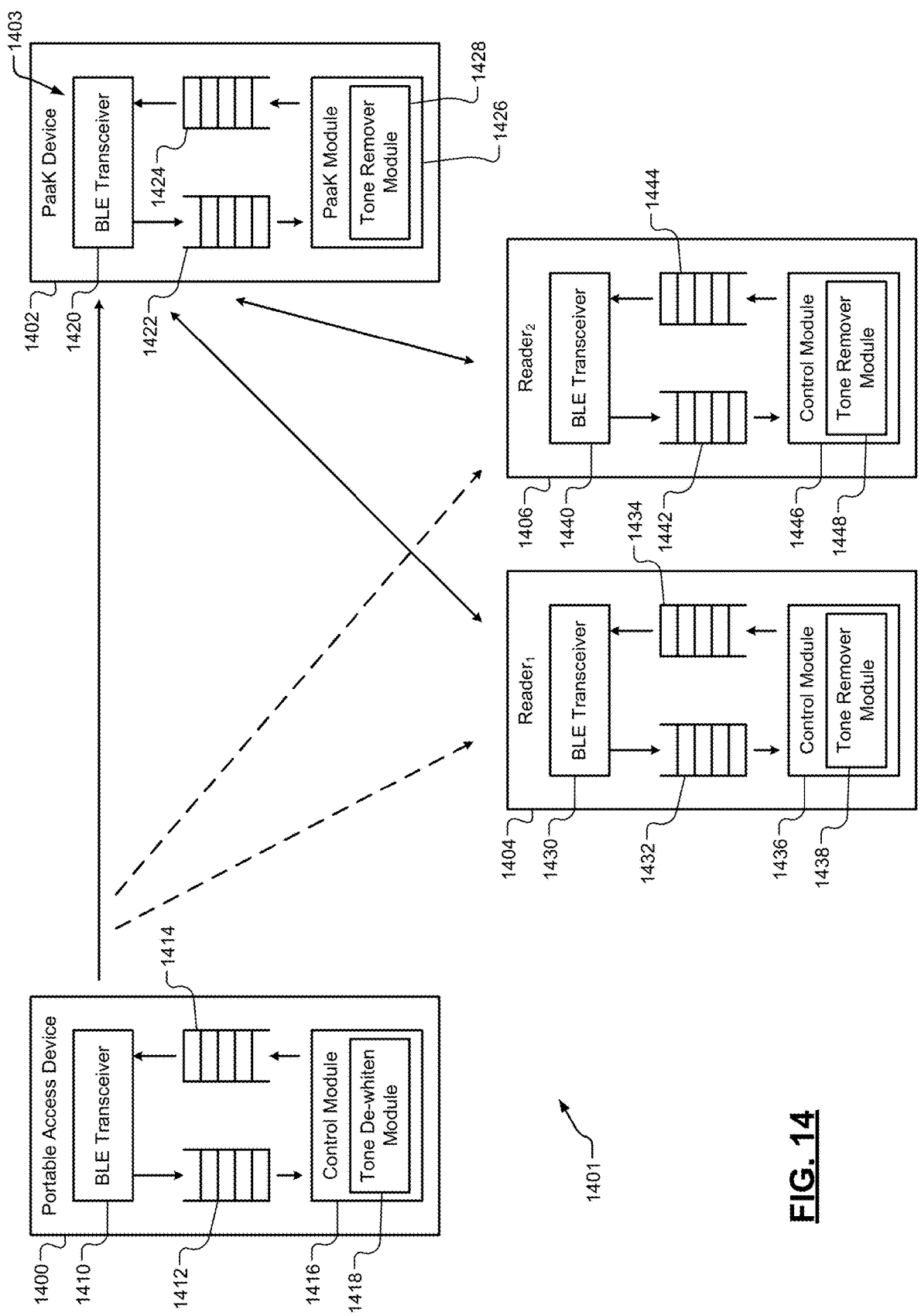
FIG. 14 is a functional block diagram illustrating a PaaK system in accordance with the present disclosure.

Additionally, the transceiver 60 may include a phone-as-a-key (PaaK) module 49, which in one embodiment is implemented by application code that is executable by the processor of the control module 20 of FIG. 2 and stored in a non-transitory computer-readable medium, such as a read-only memory (ROM) or a random-access memory (RAM). Examples of the PaaK module 49 are further described below. In one embodiment, the PaaK module 49 is implemented as part of a PaaK device as shown in FIG. 14.

Figure 5:
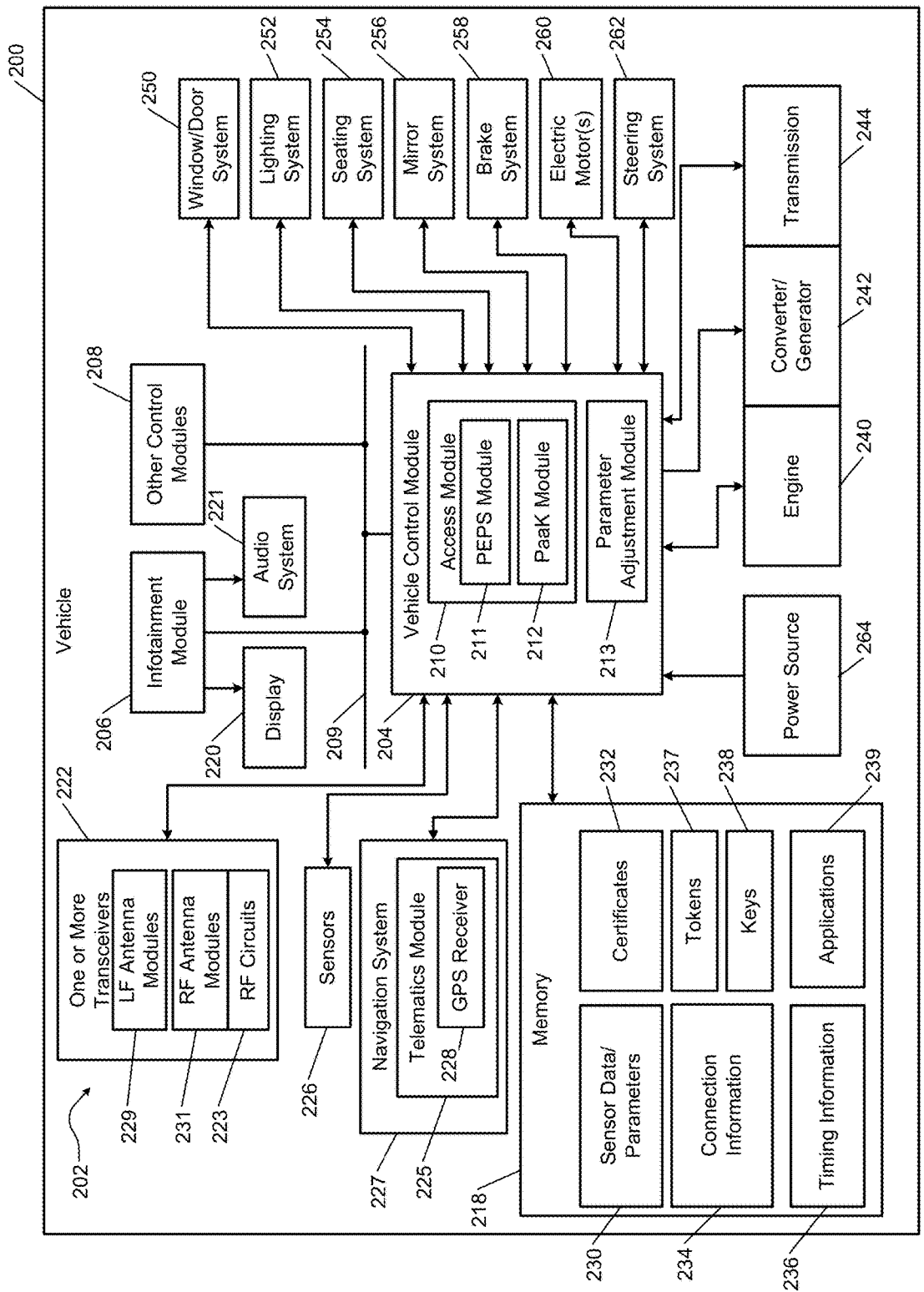
FIG. 5 is a functional block diagram of a vehicle including an access module in accordance with the present disclosure.

FIG. 5 shows a vehicle 200 that is an example of the vehicle 30 of FIGS. 1-2. The vehicle 200 includes a PaaK system 202, which includes a vehicle control module 204, an infotainment module 206 and other control modules 208 (e.g., a body control module). The modules 204, 206, 208 may communicate with each other via a controller area network (CAN) bus 209 and/or other vehicle interface (e.g., the vehicle interface 45 of FIG. 2). The vehicle control module 204 may control operation of vehicles systems. The vehicle control module 204 may include a PEPS module 211, a PaaK module 212 (e.g., the PaaK module 49 of FIG. 4) and a parameter adjustment module 213, as well as other modules. The vehicle control module 204 may also include one or more processors that are configured to execute instructions stored in a non-transitory computer-readable medium, such as the memory 218, which may include read-only memory (ROM) and/or random access memory (RAM).

The PEPS module 211 may perform PEPS operations to provide access to an interior of the vehicle and permit starting and/or operation of the vehicle. The PaaK module 212 operates in cooperation with the PEPS module 211 and performs PaaK operations as described herein. The PEPS module 211 may include the PaaK module 212 or the modules 211, 212, which may be implemented as a single module. The parameter adjustment module 213 may be used to adjust parameters of the vehicle 200.

The PaaK system 202 may further include: a memory 218; a display 220; an audio system 221; and one or more transceivers 222 including the LF antenna modules 229 and the RF antenna modules 231. The RF antenna modules 231 may include and/or be connected to RF circuits 223. The PaaK system 202 may further include: a telematics module 225; sensors 226; and a navigation system 227 including a global positioning system (GPS) receiver 228. The RF circuits 223 may be used to communicate with a mobile device (e.g., the mobile device 10 of FIG. 1) including transmission of Bluetooth® signals at 2.4 giga-Hertz (GHz). The RF circuits 223 may include BLE radios, transmitters, receivers, etc. for transmitting and receiving RF signals. The RF circuits may include one or more of the sensors 31 of FIG. 2.

The one or more transceivers 222 may include a RF transceiver including the RF circuits 223 and implement an access application having code to inspect timestamped data received and transmitted by the RF antenna modules 231. The access application may confirm whether the RF antenna modules have, for example, received correct data at the correct time. The access application may be stored in the memory 218 and implemented by the PEPS module 211 and/or the PaaK module 212. Other example operations of the access application are further described below.

The access application may implement a Bluetooth® protocol stack that is configured to provide a channel map, access identifier, next channel, and a time for a next channel. The access application is configured to output timing signals for timestamps for signals transmitted and received via the RF antenna modules 231. The access application may obtain channel map information and timing information and share this information with other modules in the vehicle.

The telematics module 225 may communicate with a server via a cell tower station. This may include the transfer of certificates, license information, and/or timing information including global clock timing information. The telematics module 225 is configured to generate location information and/or error of location information associated with the vehicle 200. The telematics module 225 may be implemented by a navigation system 227.

The sensors 226 may include sensors used for PEPS and PaaK operations, such as sensors 31 of FIG. 2, cameras, objection detection sensors, temperature sensors, accelerometers, vehicle velocity sensor, and/or other sensors. The sensors 226 may include a touch sensor to detect, for example, a person touching a door handle to initiate a process of waking up a portable access device. The sensors 226 may be connected to the other control modules 208, such as the body control module, which may be in communication with LF and RF antenna circuits and/or modules disclosed herein. The GPS receiver 228 may provide vehicle velocity and/or direction (or heading) of the vehicle and/or global clock timing information.

The memory 218 may store sensor data and/or parameters 230, certificates 232, connection information 234, timing information 236, tokens 237, keys 238, and applications 239. The applications 239 may include applications executed by the modules 229, 231, 204, 206, 208, 210, 211, 212, 223 and/or transceivers 222. As an example, the applications may include the access application, a PEPS application and/or a PaaK application executed by the transceivers 222 and the modules 210, 211, and/or 212. Although the memory 218 and the vehicle control module 204 are shown as separate devices, the memory 218 and the vehicle control module 204 may be implemented as a single device. The single device may include one or more other devices.

The vehicle control module 204 may control operation of an engine 240, a converter/generator 242, a transmission 244, a window/door system 250, a lighting system 252, a seating system 254, a mirror system 256, a brake system 258, electric motors 260 and/or a steering system 262 according to parameters set by the modules 204, 206, 208, 210, 211, 212, 213. The vehicle control module 204 may perform PEPS and/or PaaK operations, which may include setting some of the parameters. The PEPS and PaaK operations may be based on signals received from the sensors 226 and/or transceivers 222. The vehicle control module 204 may receive power from a power source 264 that may be provided to the engine 240, the converter/generator 242, the transmission 244, the window/door system 250, the lighting system 252, the seating system 254, the mirror system 256, the brake system 258, the electric motors 260 and/or the steering system 262, etc. Some of the PEPS and PaaK operations may include unlocking doors of the window/door system 250, enabling fuel and spark of the engine 240, starting the electric motors 260, powering any of the systems 250, 252, 254, 256, 258, 262, and/or performing other operations as are further described herein. In one embodiment, the vehicle 200 does not include an engine and/or a transmission.

The engine 240, the converter/generator 242, the transmission 244, the window/door system 250, the lighting system 252, the seating system 254, the mirror system 256, the brake system 258, the electric motors 260 and/or the steering system 262 may include actuators controlled by the vehicle control module 204 to, for example, adjust fuel, spark, air flow, steering wheel angle, throttle position, pedal position, door locks, window position, seat angles, etc. This control may be based on the outputs of the sensors 226, the navigation system 227, the GPS 228 and the above-stated data and information stored in the memory 218.

Figure 19:
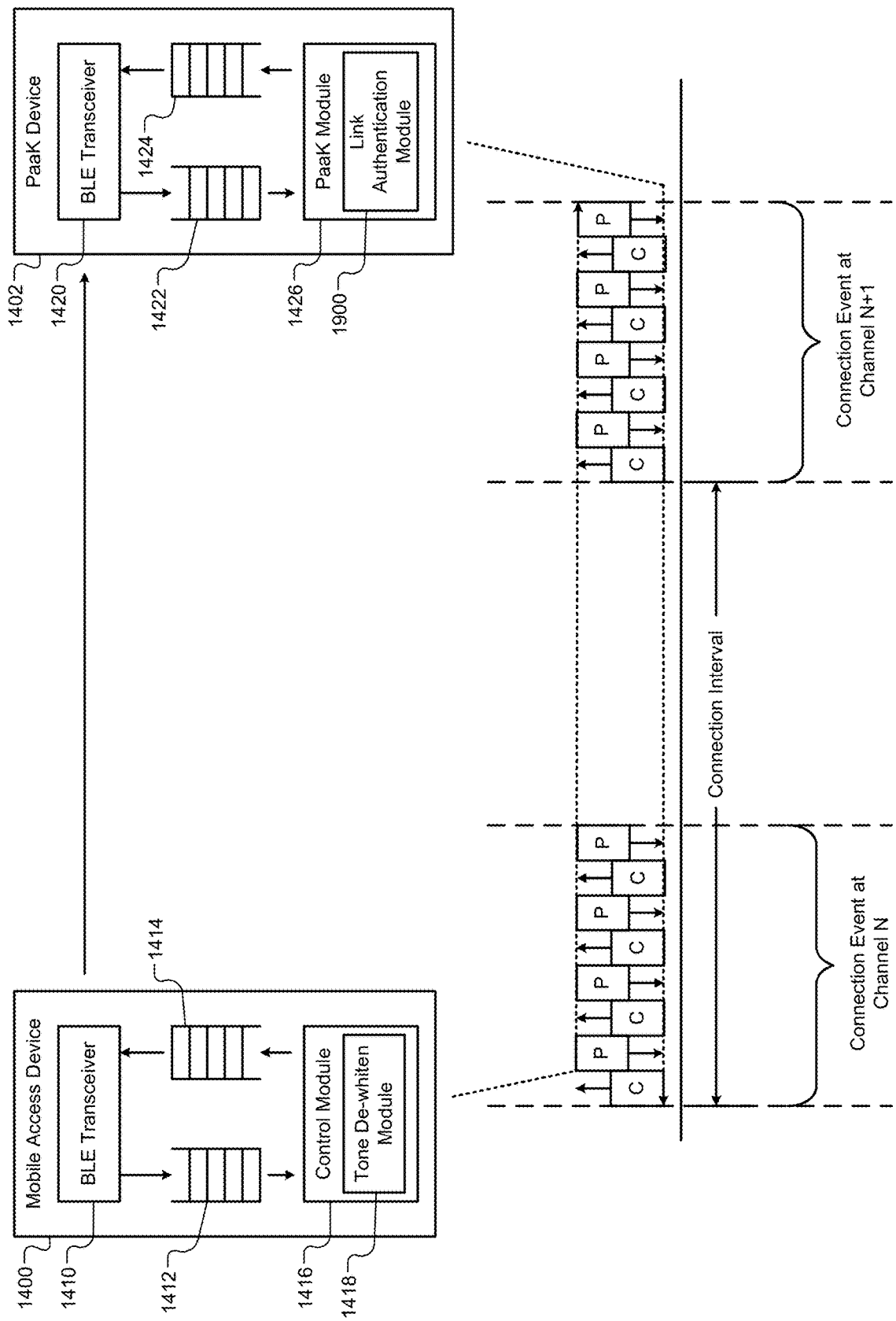
FIG. 19 is a functional block diagram illustrating packets with possible mobile de-whitened tones in accordance with the present disclosure.

The PaaK Module 212 may be implemented in a separate device. In addition, the vehicle 200 may include AoA readers. Examples of which are shown in FIGS. 14 and 19. The AoA readers are used to determine angles-Of-arrival of signals transmitted from a portable access device to the vehicle 200 and/or PaaK module 212.

Figure 6:
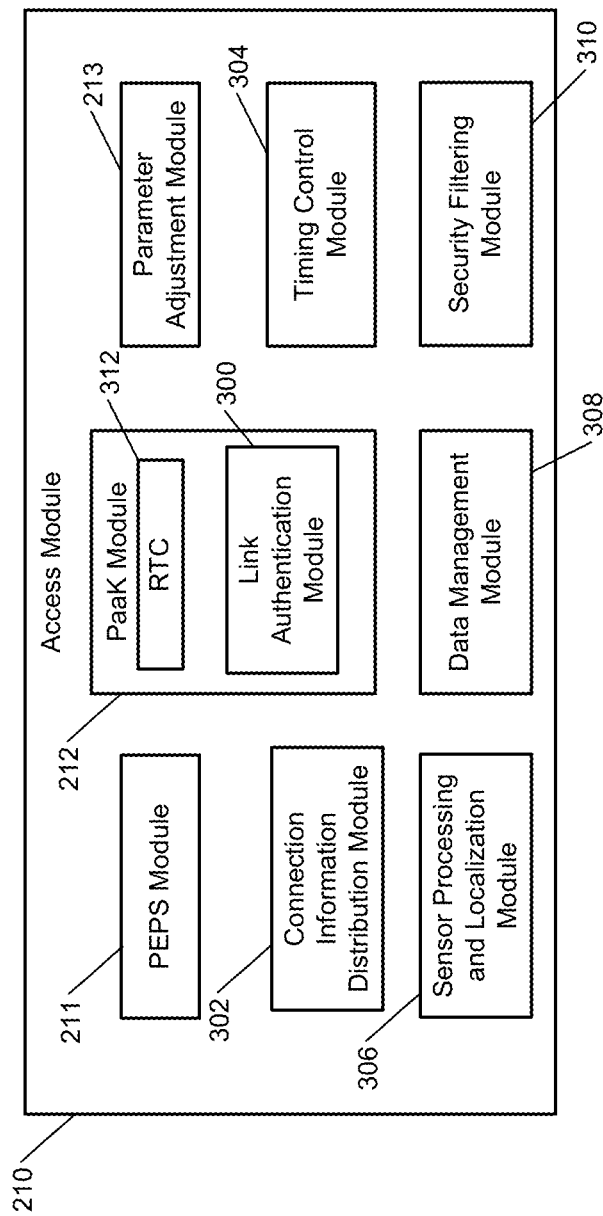
FIG. 6 is a functional block diagram of the access module of FIG. 5.

FIG. 6 shows an example of the access module 210. The access module 210 includes the PEPS module 211, the PaaK module 212, and the parameter adjustment module 213. The PaaK module 212 may include a real-time clock (RTC) 312 and a link authentication module 300, which may be implemented separate from the PaaK module 212. The access module 210 may further include a connection information distribution module 302, a timing control module 304, a sensor processing and localization module 306, a data management module 308 and a security filtering module 310. The RTC 312 that maintains a local clock time.

The link authentication module 300 may authenticate the portable access device of FIGS. 1-2 and establish the secure communication link. For example, the link authentication module 300 may be configured to implement challenge-response authentication or other cryptographic verification algorithms in order to authenticate the portable access devices.

The connection information distribution module 302 is configured to communicate with at least some of the sensors 31 of FIG. 2 and provide the sensors 31 with communication information necessary for the sensors to find and then follow, or eavesdrop on, the secure communication link. This may occur once the sensors 31 are synchronized with the communication gateway 29. As an example, the vehicle 200 of FIG. 5 and/or the PaaK system 202 may include any number of sensors disposed anywhere on the vehicle 200 for detecting and monitoring portable access devices. The connection information distribution module 302 is configured to obtain information corresponding to communication channels and channel switching parameters of a communication link and transmit the information to the sensors 226. In response to the sensors 226 receiving the information from the connection information distribution module 302 via the vehicle interface 45 of FIG. 2 and the sensors 226 being synchronized with the communication gateway, the sensors 226 may locate and follow, or eavesdrop on, the communication link.

The timing control module 304 may: maintain the RTC and/or currently stored date if not handled by the PaaK module 212; disseminate current timing information with the sensors; generate timestamps for incoming and outgoing messages, requests, signals, certificates, and/or other items; calculate round trip times; etc. A round trip time may refer to the amount between when a request is generated and/or transmitted and a time when a response to the request is received. The timing control module 304 may obtain timing information corresponding to a communication link when the link authentication module 300 executes challenge-response authentication. The timing control module 304 is also configured to provide the timing information to the sensors 226 via the vehicle interface 209.

After link authentication is established, the data management module 308 collects the current location of the vehicle 200 from the telematics module 225 and shares the location with the portable access devices. The portable access devices optionally include GPS modules and application software that when executed compares the estimated relative locations of the portable access devices to the vehicle 200. Based on the estimated positions of the portable access devices relative to the vehicle 200, the portable access devices may send signals to one of the transceivers 222 requesting the vehicle to perform certain actions. As an example, the data management module 308 is configured obtain vehicle information obtained by any of the modules (e.g., location information obtained by a telematics module 225) and transmit the vehicle information to the portable access devices.

The security filtering module 310 detects violations of a physical layer and protocol and filter data accordingly before providing information to the sensor processing and localization module 306. The security filtering module 310 flags data as injected such that the sensor processing and localization module 306 is able to discard data and alert the PEPS module 211. The data from the sensor processing and localization module 306 is passed along to the PEPS module 211, whereby the PEPS module 211 is configured to read vehicle state information from the sensors in order to detect user intent to access a feature and to compare the location of the portable access device to a set of locations that authorize certain vehicle features, such as unlocking a door or trunk of the vehicle and/or starting the vehicle.

Figure 7:
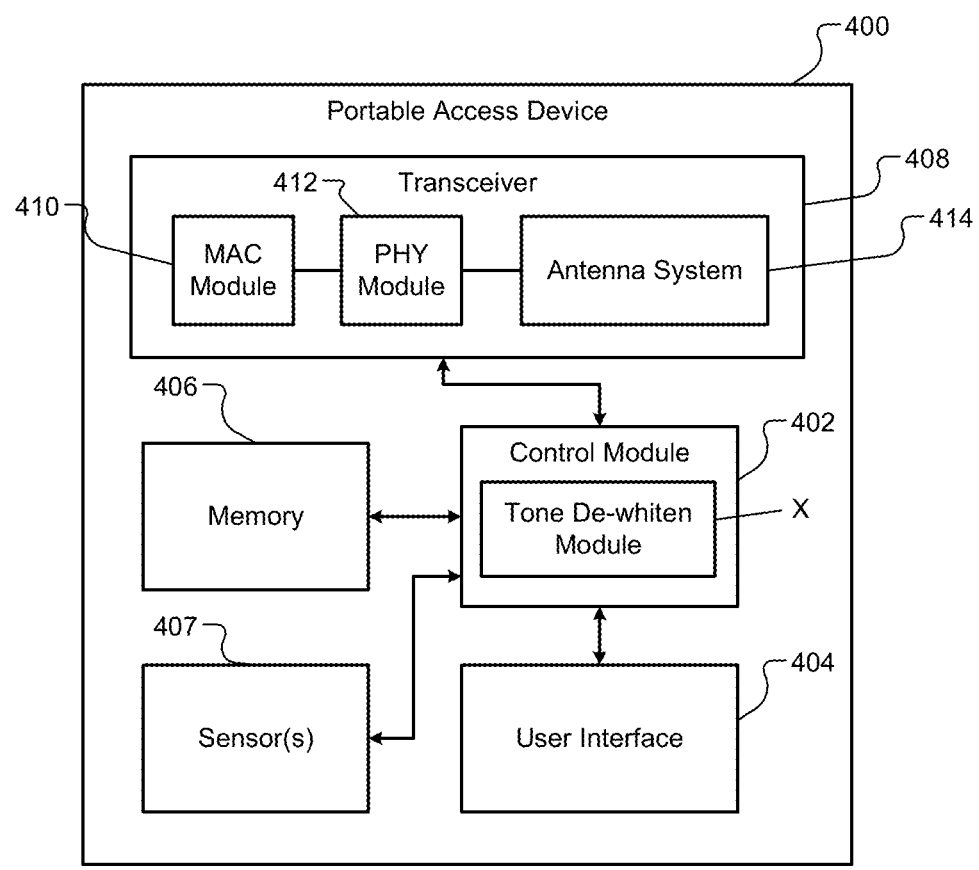
FIG. 7 is a functional block diagram of a portable access device in accordance with the present disclosure.

FIG. 7 shows a portable access device 400, which is an example of the portable access device 10 of FIGS. 1-2. The portable access device 400 may include a control module 402, a user interface 404, a memory 406, sensors 407 and a transceiver 408. The transceiver 408 may include a medium access control (MAC) module 410, a PHY module 412 and multiple linear polarized antennas 414.

The control module 402 may include or be part of a BLE communication chipset. Alternatively, the control module 402 may include or be part of a Wi-Fi or Wi-Fi direct communication chipset. The memory 406 may store application code that is executable by the control module 402. The memory 406 may be a non-transitory computer-readable medium including read-only memory (ROM) and/or random-access memory (RAM).

The control module 402 communicates with the modules 204, 211, 212 of the vehicle 200 of FIG. 5 and performs authentication and other operations as further described below. The control module 402 may transmit information regarding the portable access device 400, such as location and/or velocity information obtained from one or more of the sensors 407 (e.g., a global navigation satellite system (e.g., GPS) sensor, an accelerometer, and/or an angular rate sensor). The user interface 404 may include a key pad, a touch screen, a voice activated interface, and/or other user interface.

Figure 8:
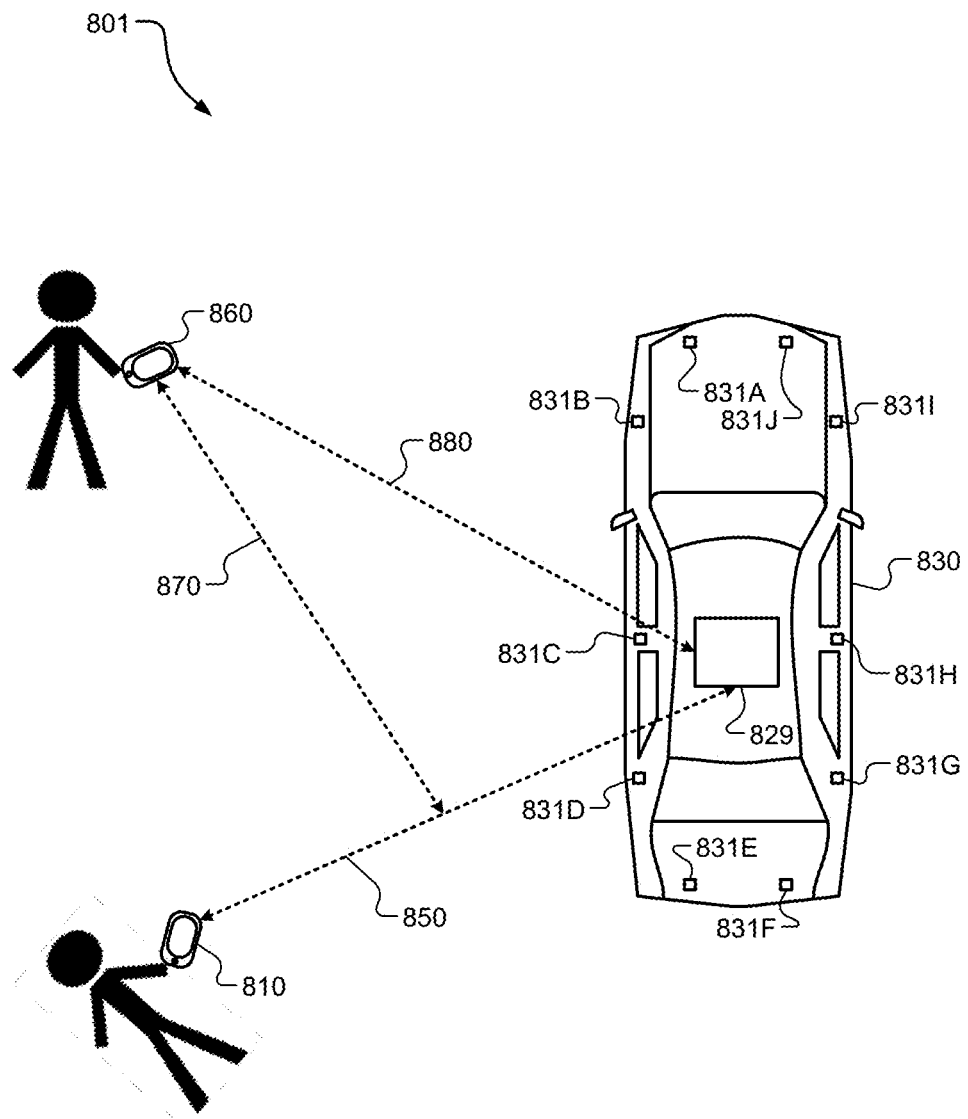
FIG. 8 is a diagram illustrating an unauthorized device attacking a communication link between an authorized portable access device and a vehicle.

With reference to FIG. 8, a PEPS system 801 is shown and includes a vehicle 830, a communication gateway 829, and sensors 831. The sensors 831 are configured to take measurements of physical properties of a wireless signal transmitted by a portable access device 810 to the communication gateway 829 via a communication link 850. The sensors 831 may measure, for example, the angle of arrival (AoA) of the wireless signals transmitted via the communication link 850. In response to a control module receiving the AoA measurements from the sensors 831, the control module may determine the location of the portable access device 810, the distance between the portable access device 810 and the vehicle 830, and/or trajectory of the portable access device 810 based on the AoA measurements received from the sensors 831.

Based on the location of the portable access device 810, the distance between the portable access device 810 and the vehicle 830, and/or trajectory of the portable access device 810, the control module may activate certain vehicle functions. These functions may include setting mirror positions, adjusting a steering wheel position, adjusting a seat position of a driver, modifying climate control settings, adjusting audio/media settings, unlocking a door of the vehicle, unlocking a trunk of the vehicle, activating a lighting system of the vehicle, starting the vehicle, etc.

In one embodiment, an unauthorized device 860 may be configured to manipulate signals of and/or directly inject signals into a vehicle interface via the communication link 850 based on wireless vulnerabilities of the PEPS system 801. As an example, the unauthorized device 860 may be configured to execute a replay attack, as indicated by dashed arrows 870, 880, on the communication link 850 in order to transmit and/or receive messages from the control module. As such, a user of the unauthorized device 860 may fraudulently and/or maliciously activate and/or obtain access to certain vehicle functions.

Figure 9:
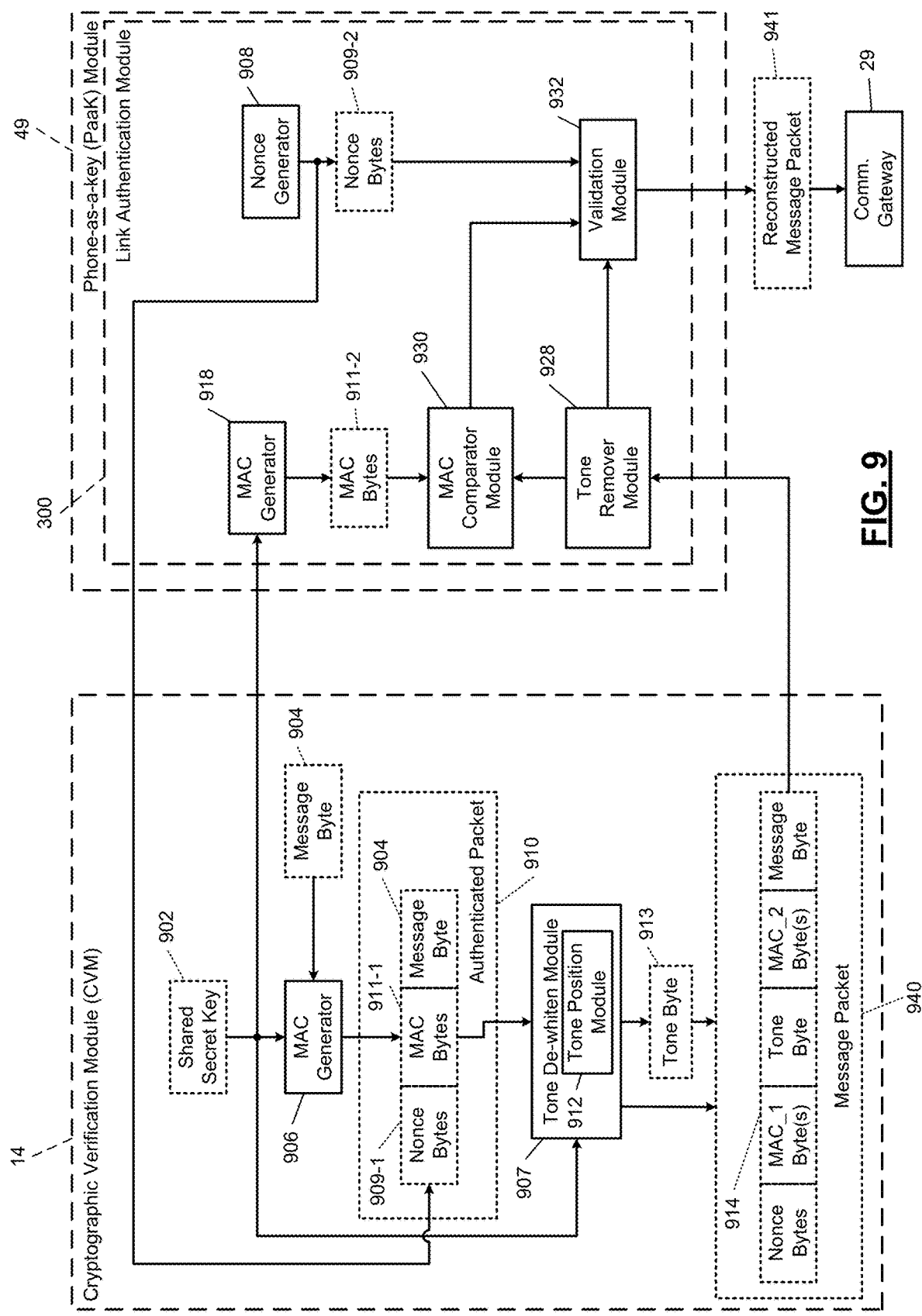
FIG. 9 is a functional block diagram of a cryptographic verification module and a phone-as-a-key (PaaK) module in accordance with the present disclosure.

FIG. 9 shows examples of the CVM 14 and the PaaK module 49 of FIG. 4. With reference to FIGS. 2, 4 and 9, the CVM 14 may include a message authentication code (MAC) generator 906, a tone de-whiten module 907 and a tone position module 912 that are used to generate a message packet 940. The acronym MAC, with respect to FIGS. 9-20, refers to a message authentication code and not to medium access control. The PaaK module 49 includes the link authentication module 300, which may include a nonce generator 908, a MAC generator 918, a tone remover module 928, a MAC comparator module 930, and a validation module 932 that are used to determine whether the message packet 940 is valid.

In order to establish the communication link 50 and subsequently transmit message byte 904 to the communication gateway 29 via the PaaK module 49, the tone de-whiten module 907 is configured to insert one or more tone bytes (a single tone byte 913 is shown in FIG. 9). As an example, the tone byte may be a de-whitened tone byte and be located at a random or pseudo-random location of a payload 914 of the message packet 940. In one embodiment, more than one tone byte is included. A de-whitened tone byte may refer to a byte that includes and/or has been de-whitened to provide a series of bits all of which having a same value (e.g., all zeros or all ones).

Subsequently, the PaaK module 49 provides the message byte 904 to the communication gateway 29 if, for example, the PaaK module 49 is able to remove the tone bytes from the payload 914 and verify the authenticity and integrity of other portions of the payload 914, as described below in further detail.

In one example embodiment, the CVM 14 is configured to generate an authenticated packet 910, which includes the message byte 904, MAC bytes 911-1 generated by the MAC generator 906, and nonce bytes 909-1 generated by the nonce generator 908. The MAC generator 906 is configured to protect and/or guarantee the integrity or authenticity of the data in the message byte 904. In some embodiments, the MAC generator 906 is configured to generate the MAC bytes 911-1 using, for example, a symmetric encryption or decryption algorithm, such as an advanced encryption standard (AES) or a hash-based message authentication algorithm (HMAC). As a specific example, the MAC generator 906 may generate the MAC bytes 911-1 based on a first portion of a shared secret key 902 and the message byte 904.

The nonce generator 908 is configured to generate nonce bytes 909-1, 909-2, which are random or pseudo-random numbers (e.g., a 32-byte value). Specifically, when nonce bytes 909-1 are combined with the MAC bytes 911-1 and the message byte 904, the communication link 50 may avoid being subjected to replay attacks.

The tone position module 912 is configured to, based on a second portion of the shared secret key 902, the authenticated packet 910, and/or the communication channel, generate and pseudo-randomly insert the tone bytes (e.g., the de-whitened tone bytes) into the authenticated packet 910 in order to generate the payload 914. The tone position module 912 may insert the tone bytes at any locations within the authenticated packet 910, including, for example, after one of the nonce bytes 909-1, the MAC bytes 911-1, or the message byte 904, as described below in further detail with reference to FIGS. 10A-10G. Alternatively, the tone position module 912 may insert a tone byte between a first portion and a second portion of the nonce bytes 909-1; between a first portion and a second portion of the MAC bytes 911-1; or between a first portion and a second portion of the message byte 904, as described below in further detail with reference to FIGS. 10A-10G. As shown in FIG. 9, the tone position module 912 pseudo-randomly inserts a tone byte between a first portion and a second portion of the MAC bytes 911-1, where the first portion of MAC bytes 911-1 is represented as MAC_1 Byte(s), and the second portion of MAC bytes 911-1 is represented as MAC_2 Byte(s). Alternatively, the tone position module 912 may insert a tone byte at a fixed or random location that is selected based on service and/or characteristic attributes of the BLE communication protocol.

In some embodiments, the tone bytes may each be any 8-bit value. In other embodiments, the tone bytes may each be limited to certain 8-bit values. As an example, the tone bytes may each have a limit regarding how many consecutive bits of the same value are present within the tone bytes in order to, for example, avoid introducing DC bias into the payload 914 (e.g., the tone bytes may each not have more than five consecutive values of 1 and/or 0).

As described further below, the message packet 940 or a portion thereof may be whitened and/or generated to minimize lengths of sequences of consecutive zeros and/or consecutive ones to prevent direct current (DC) bias in the signal transmitted from the CVM 14 to the PaaK module 49 including the message packet 940. The message packet 940 may be whitened except for the bits of the tone bytes. This whitening process may be based on a whitening key, which may be provided to the PaaK module 49. The whitening key may be the same or different than the shared secret key 902. In one embodiment, the lengths of consecutive series of zeros and/or ones is minimized when the authenticated packet 910 is generated using the shared secret key 902. In another embodiment, more than one tone byte may be included and pseudo-randomly or randomly inserted in the message packet. The resulting locations of the tone bytes may be reported to the PaaK module 49 for removal by the one or more tone bytes by the tone remover module 928. The keys may also be reported to the PaaK module 49 for de-whitening of the remainder of the message packet by the tone remover module 928 and/or MAC comparator module 930.

Subsequently, the CVM 14 may transmit the message packet 940, which includes the payload 914, a preamble byte (not shown), access address bytes (not shown), header bytes (not shown), and cyclical redundancy check bytes (not shown), to the tone remover module 928 of the PaaK module 49. The tone remover module 928 is configured to remove the tone bytes from the message packet 940 (i.e., execute a whitening algorithm on the payload 914 in order to remove the tone bytes).

In response to removing the tone bytes, the MAC comparator module 930 is configured to determine whether the MAC bytes 911-1 generated by the MAC generator 906 match MAC bytes 911-2 generated by the MAC generator 918 of the PaaK module 49. Additionally, the validation module 932 may determine whether the nonce bytes 909-1 match nonce bytes 909-2 generated by the nonce generator 108. If the validation module 932 determines that the nonce bytes 909-1, 909-2 match and receives an indication from the MAC comparator module 930 that the MAC bytes 911-1, 911-2 match, then the communication link 50 is authorized.

The tone remover module 928 and/or the MAC comparator module 930 may perform de-whitening based on the one or more keys to recover one or more bytes of the authenticated packet 910. Moreover, if the validation module 932 determines that the nonce bytes 909-1, 909-2 match and the MAC comparator module 930 determines that the MAC bytes 911-1, 911-2 match, the validation module 932 may be configured to generate a reconstructed message packet 941, which includes all of the contents of the message packet 940 except for the one or more tone bytes. Accordingly, the validation module 932 may subsequently provide the reconstructed message packet 941 to the communication gateway 29. In other embodiments, the validation module 932 may solely transmit the message byte 904 to the communication gateway 29 if the validation module 932 determines that the nonce bytes 909-1, 909-2 match and the MAC comparator module 930 determines that the MAC bytes 911-1, 911-2 match.

With reference to FIGS. 10A-10G, example illustrations of the message packet 940 are shown. The message packets 940 may either be an advertising BLE packet or a data BLE packet, and a communication channel in which the message packet 940 is transmitted or received may vary based on the type of message packet (e.g., advertising BLE packets are only transmitted on channels 37-39 of the BLE communication protocol).

In some embodiments, the message packet 940 may include a preamble portion 942 (8 bits), an access address portion 944 (32 bits), a protocol data unit portion 946 (536 bits), and a cyclical redundancy check portion 948 (24 bits). When the message packet 940 is the advertising BLE packet, the access address portion 944 may have bit values that are uniform amongst all BLE-enabled devices (i.e., a common access address) in order to enable the discovery of the BLE-enabled devices. The protocol data unit portion 946 may include a header portion 950 (16 bits), which includes logical link identifier (LLID) bits, a next expected sequence number (NESN) bit, a sequence number (SN) bit, a more data (MD) bit, length bits, and bits that are reserved for future use (RFU). The LLID bits may indicate whether the message packet 940 includes data or control messages. The NESN and SN bits may represent a sequence number for acknowledgment and flow control. The MD bit may indicate whether the portable access device 10 intends to send additional message packets 940 while the portable access device 10 and the communication gateway 29 communicate via communication link 50. The length bits may represent the length of the payload 914.

Figure 10A:
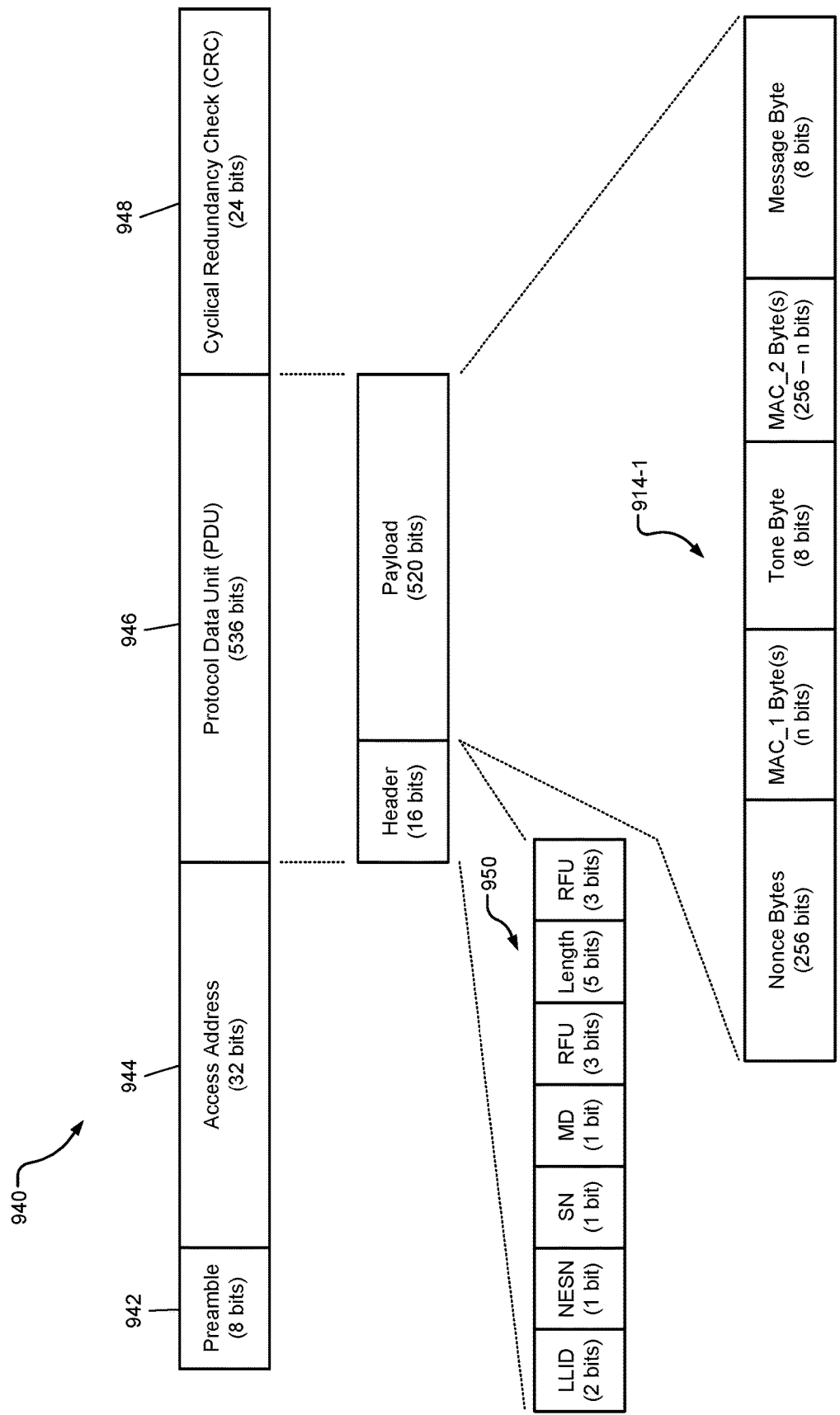
FIGS. 10A-10G is a packet diagram illustrating example message packets in accordance with the present disclosure.

As described above, the tone position module 912 is configured to, based on a second portion of the shared secret key 902 and the authenticated packet 910, generate and pseudo-randomly insert the tone byte 913 (e.g., a de-whitened tone byte) into the authenticated packet 910 in order to generate the payload 914. As an example and as shown in FIG. 9 and FIG. 10A, the tone position module 912 may insert a tone byte between a first portion and a second portion of the MAC bytes 911-1 in order to generate payload 914-1, where the first portion of MAC bytes 911-1 is represented as MAC_1 Byte(s), and the second portion of MAC bytes 911-1 is represented as MAC_2 Byte(s).

Figure 10B:
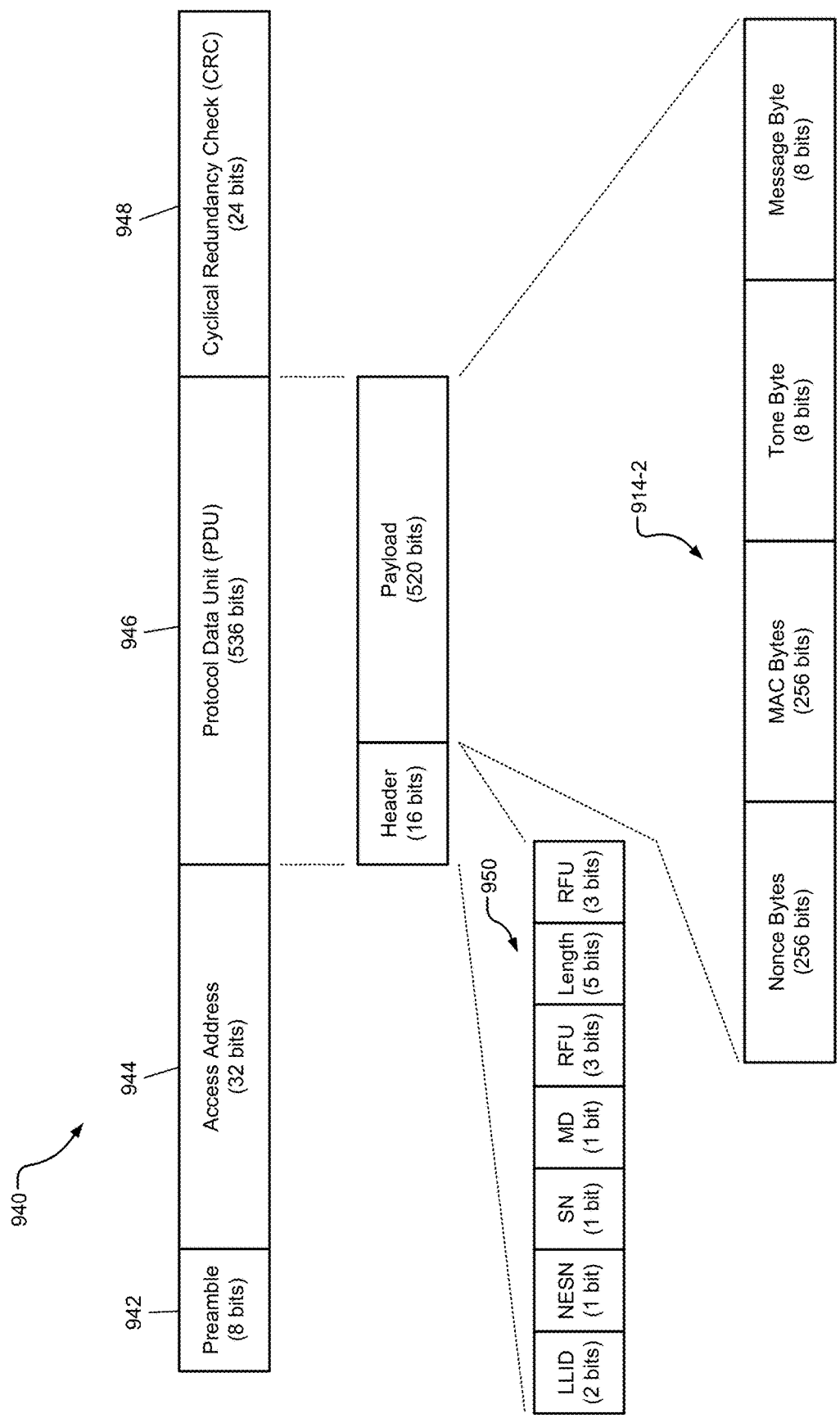
Figure 10C:
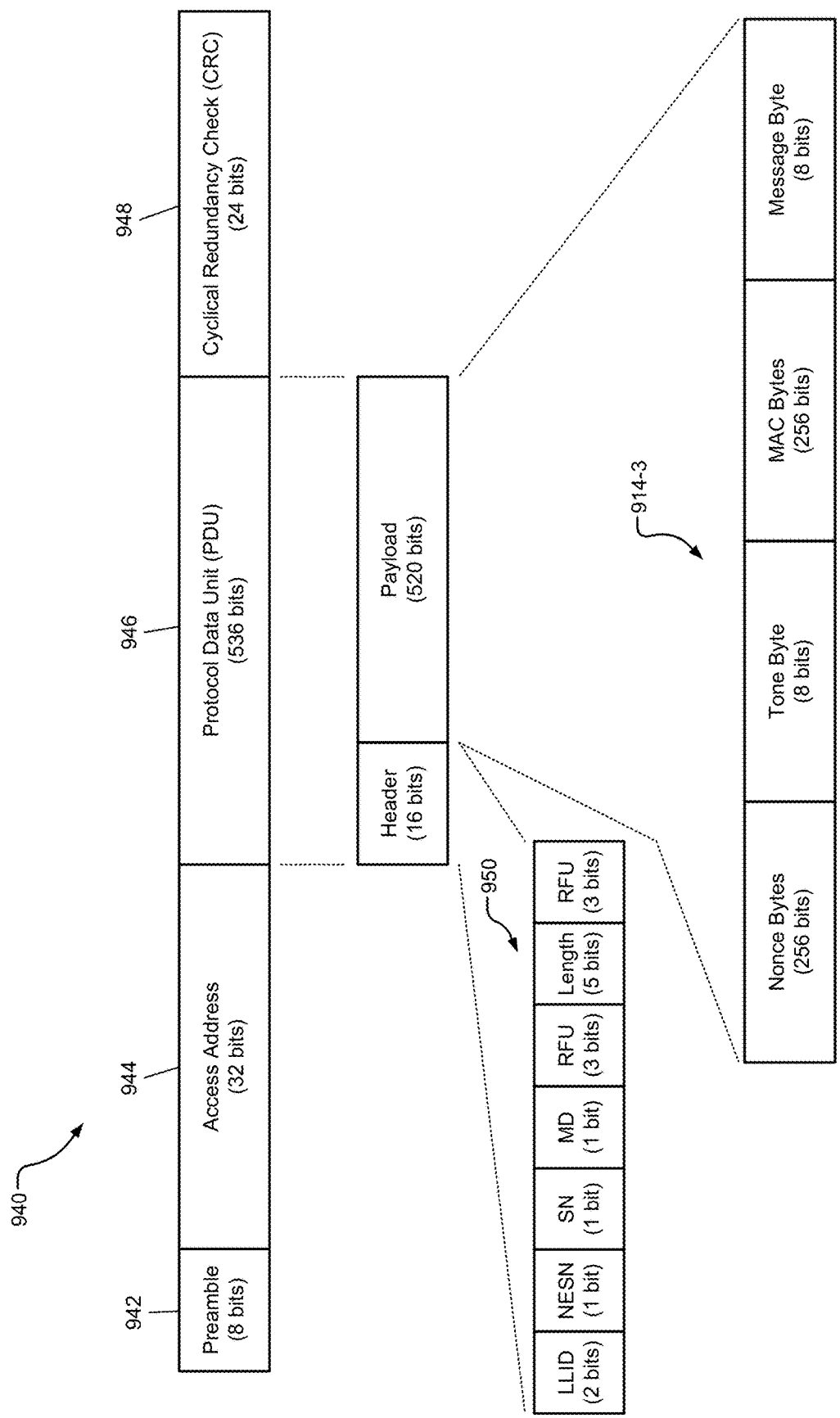

As another example and as shown in FIG. 10B, the tone position module 912 may insert a tone byte between the MAC bytes 911-1 and the message byte 904 in order to generate payload 114-2. As shown in FIG. 10C, the tone position module 912 may insert a tone byte between the nonce bytes 909-1 and the MAC bytes 911-1 in order to generate payload 914-3.

Figure 10D:
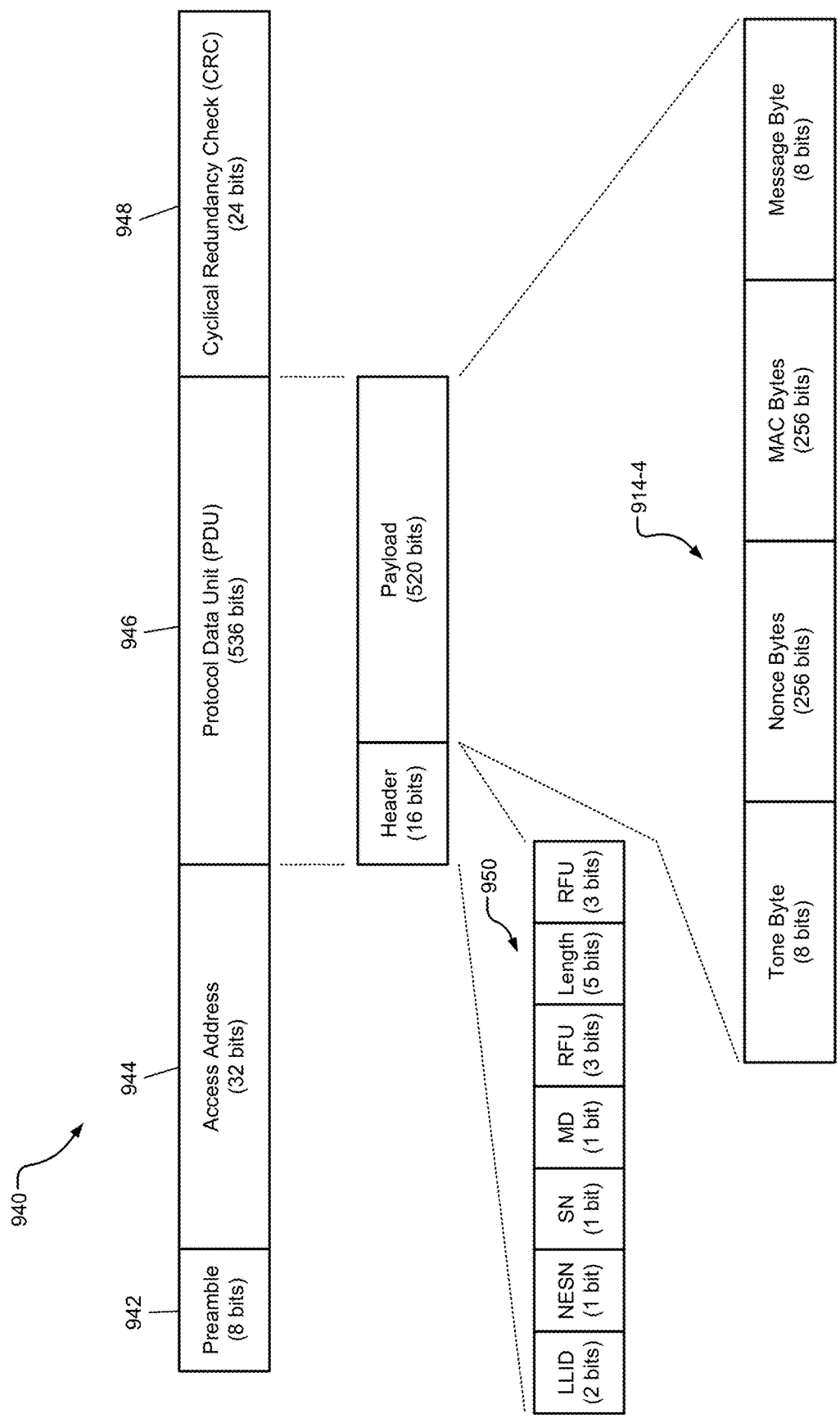
Figure 10E:
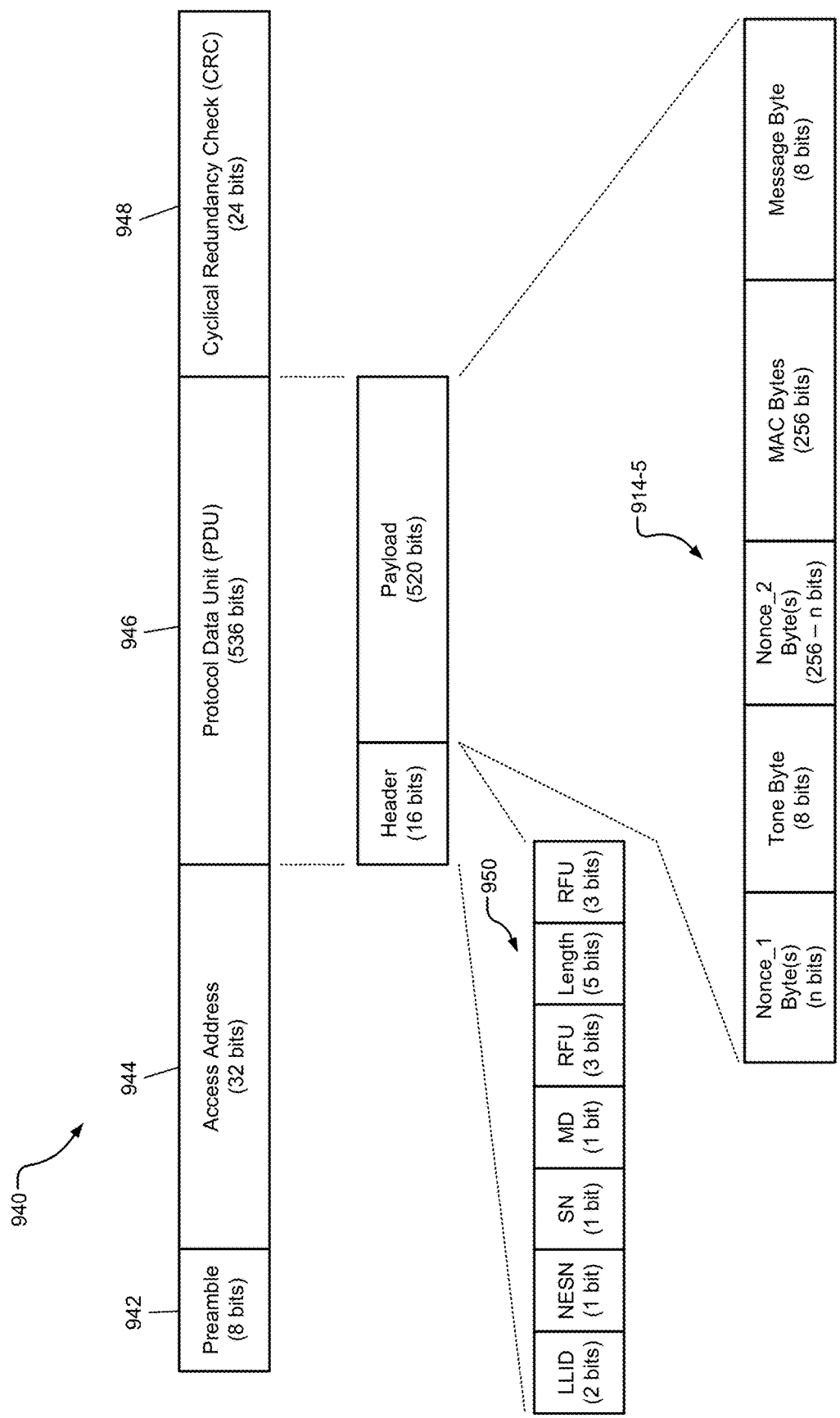

As another example and as shown in FIG. 10D, the tone position module 912 may insert a tone byte before the nonce bytes 909-1 in order to generate payload 914-4. As shown in FIG. 10E, the tone position module 912 may insert a tone byte between a first portion and a second portion of the nonce bytes 909-1 in order to generate payload 914-5, where the first portion of nonce bytes 909-1 is represented as Nonce_1 Byte(s), and the second portion of nonce bytes 909-1 is represented as Nonce_2 Byte(s).

Figure 10F:
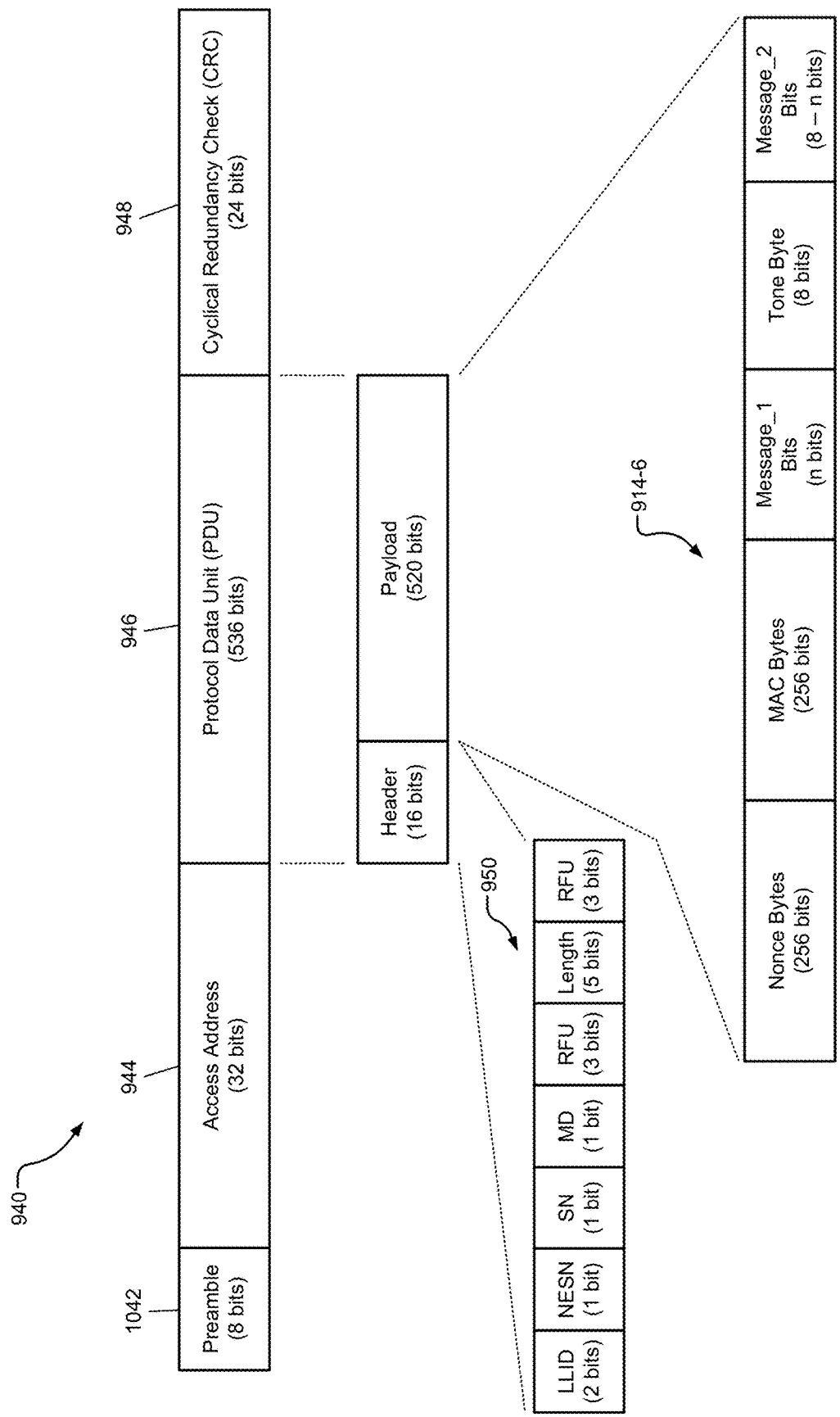
Figure 10G:
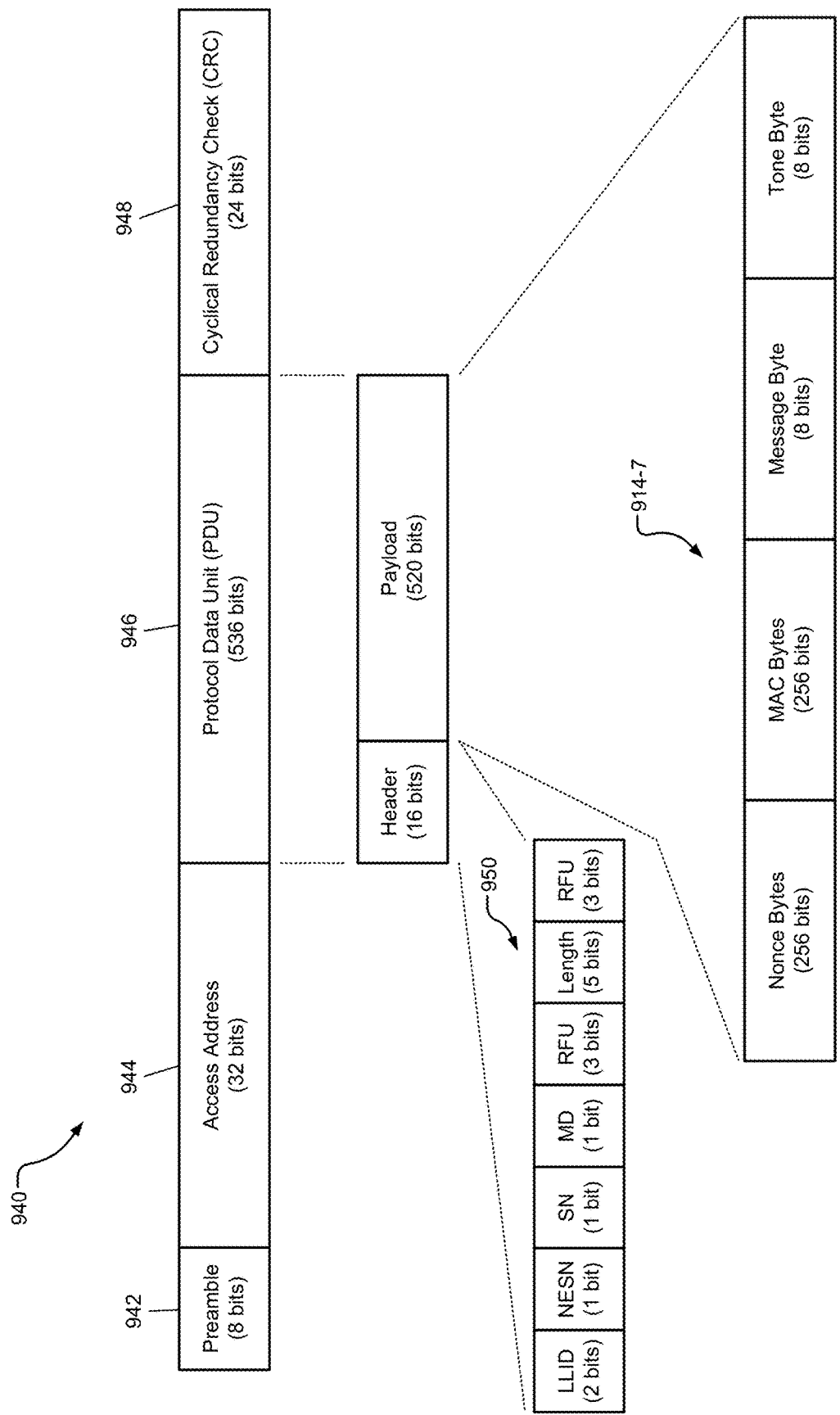

As another example and as shown in FIG. 10F, the tone position module 912 may insert a tone byte between a first portion and a second portion of the message byte 904 in order to generate payload 914-6, where the first portion of message byte 904 is represented as Message_1 Bits, and the second portion of the message byte 904 is represented as Message_2 Bits. As shown in FIG. 10G, the tone position module 912 may insert a tone byte after the message byte 904 in order to generate payload 914-7.

Figure 11:
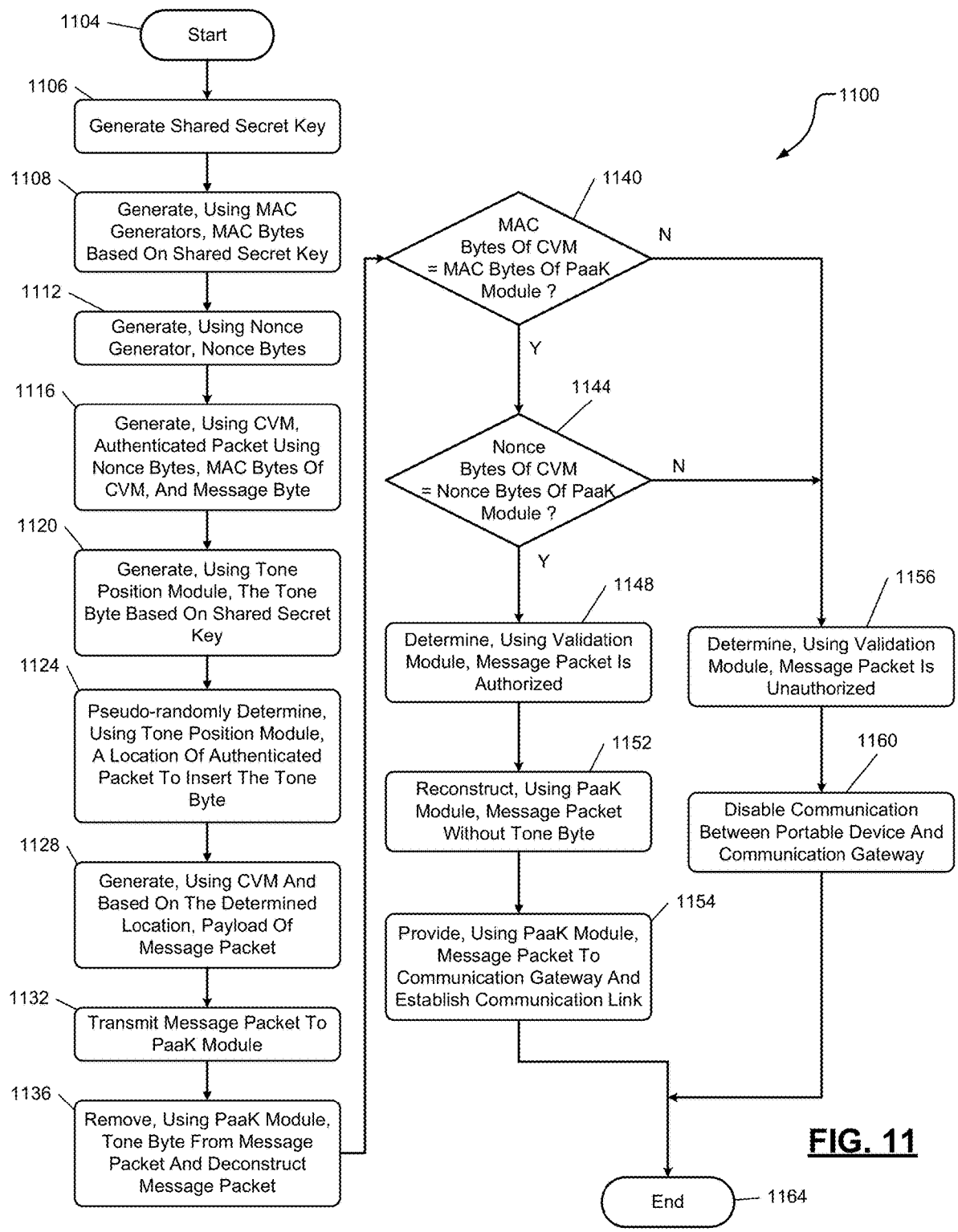
FIGS. 11-13 illustrate example control methods in accordance with the present disclosure.

With reference to FIG. 11, a flowchart illustrating a control method 1100 for establishing the communication link 50 between the portable access device 10 and the communication gateway 29 is shown. The control method 1100 may begin at 1104 when, for example, the portable access device 10 is turned on and within a communication predetermined range of the communication gateway 29. At 1106, a shared secret key 902 is generated. At 1108, the MAC generators 906, 918 generate MAC bytes 911-1, 911-2 based on the shared secret key 902. At 1112, the nonce generator 908 generates using nonce bytes 909-1, 909-2. At 1116, the CVM 14 generates the authenticated packet 910 using the nonce bytes 909-1, the MAC bytes 911-1, and the message byte 904.

At 1120, the tone position module 912 generates the tone bytes using the tone position module 912 based on the shared secret key 902. At 1124, the tone position module 912 pseudo-randomly determines locations of the authenticated packet 910 to insert the tone bytes. At 828, the CVM 14 generates, based on the determined location, the payload 914 of the message packet 940. At 1132, the message packet 940 is transmitted to the PaaK module 49. At 1136, the PaaK module 49 removes the tone bytes from the message packet 940 and deconstructs the message packet 940 (i.e., the PaaK module 49 provides the MAC bytes 911-1 to the MAC comparator module 930 and provides the nonce bytes 909-1 to the validation module 932).

At 1140, the MAC comparator module 930 determines whether the MAC bytes 911-1 generated by the MAC generator 906 match the MAC bytes 911-2 generated by the MAC generator 918. If yes, operation 1144 is performed, otherwise operation 1156 is performed. At 944, the validation module 932 determines whether the nonce bytes 909-1 match the nonce bytes 909-2 in order to, for example, verify that the PEPS system 1 is not being subjected to a replay attack. If yes, operation 1148 is performed, otherwise operation 1156 is performed.

At 1148, the validation module 932 determines that the message packet 940 is authorized and then proceeds to operation 1152. At 1152, the validation module 932 reconstructs the message packet 940 without the tone bytes (i.e., generates the reconstructed message packet 941). At 1154, the PaaK module 49 provides the reconstructed message packet 941 to the communication gateway 29, establishes the communication link 50, and then proceeds to operation 1164.

At 1156, the validation module 932 determines that the message packet 940 is unauthorized and then disables communication between the portable access device 10 and the communication gateway 29 at 1160. The method may end at 1164.

Figure 12:
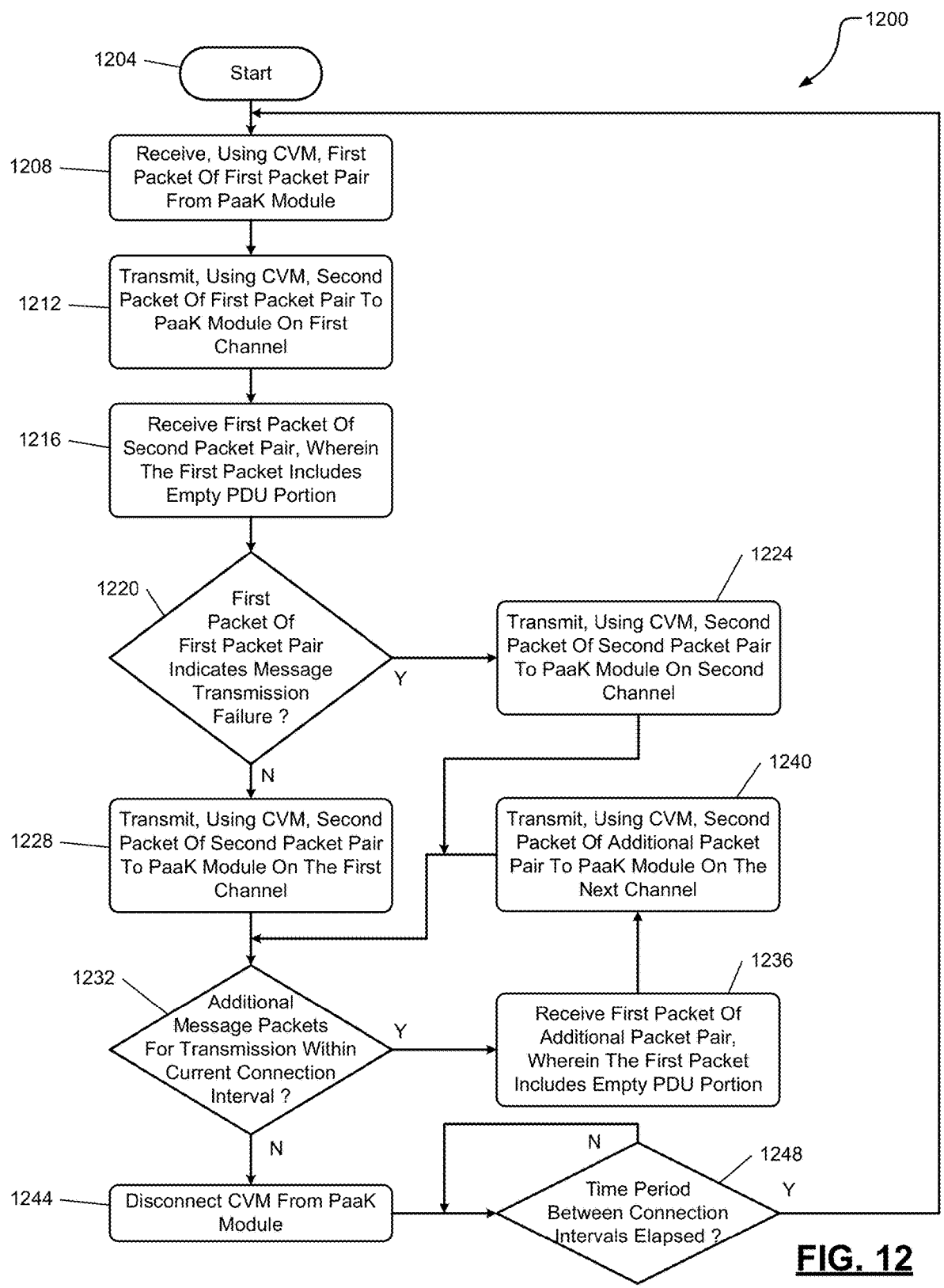

With reference to FIG. 12, an example control method 1200 illustrating a control loop between the portable access device 10 and the vehicle 30 of FIG. 2 is shown. The control method 1200 may begin at 1204 when, for example, the portable access device 10 is turned on and within a communication predetermined range of the communication gateway 29. At 1208, the CVM 14 receives a first message packet of a first packet pair from the PaaK module 49. At 1212, the CVM 14 transmits a second message packet of the first packet pair to the PaaK module 49 on a first communication channel (e.g., one of BLE channels 1-39). Transmitting a message packet to the PaaK module 49 is described below in further detail with reference to FIG. 13.

At 1216, the CVM 14 receives a first message packet of a second packet pair and the first packet of the second pair includes an empty protocol data unit (PDU) portion 946. At 1220, the CVM 14 determines whether the first message packet of the first packet pair indicates a message transmission failure. As an example, if the first message packet of the first packet pair indicates that the CVM 14 is behind by at least one channel in a channel hop sequence, the CVM 14 may indicate a message transmission failure. If the CVM 14 indicates a message transmission failure, the CVM 14, at 1224, transmits a second message packet of the second packet pair to the PaaK module 49 on a second communication channel and then proceeds to 1232. If the CVM 14 does not indicate a message transmission failure, the control method 1200 proceeds to 1228 and transmits the second message packet of the second packet pair to the PaaK module 49 on the first communication channel and then proceeds to 1232.

At 1232, the wireless communication chipset 11 determines whether additional message packets for transmission are needed within the current connection interval. If yes, operation 1236 is performed, otherwise operation 1244 is performed. At 1236, the CVM 14 receives a first message packet of an additional packet pair, where the first packet of the additional packet pair includes the empty PDU portion 946. At 1240, the CVM 14 transmits the second message packet of the additional packet pair to the PaaK module 49 on the next communication channel and then operation 1232 is performed. At 1244, the CVM 14 is disconnected from the PaaK module 49. At 1248, the CVM 14 determines whether a time period between connection intervals has elapsed (e.g., 50 ms). If yes, operation 1208 is performed, otherwise the CVM 14 waits until the time period has elapsed.

Figure 13:
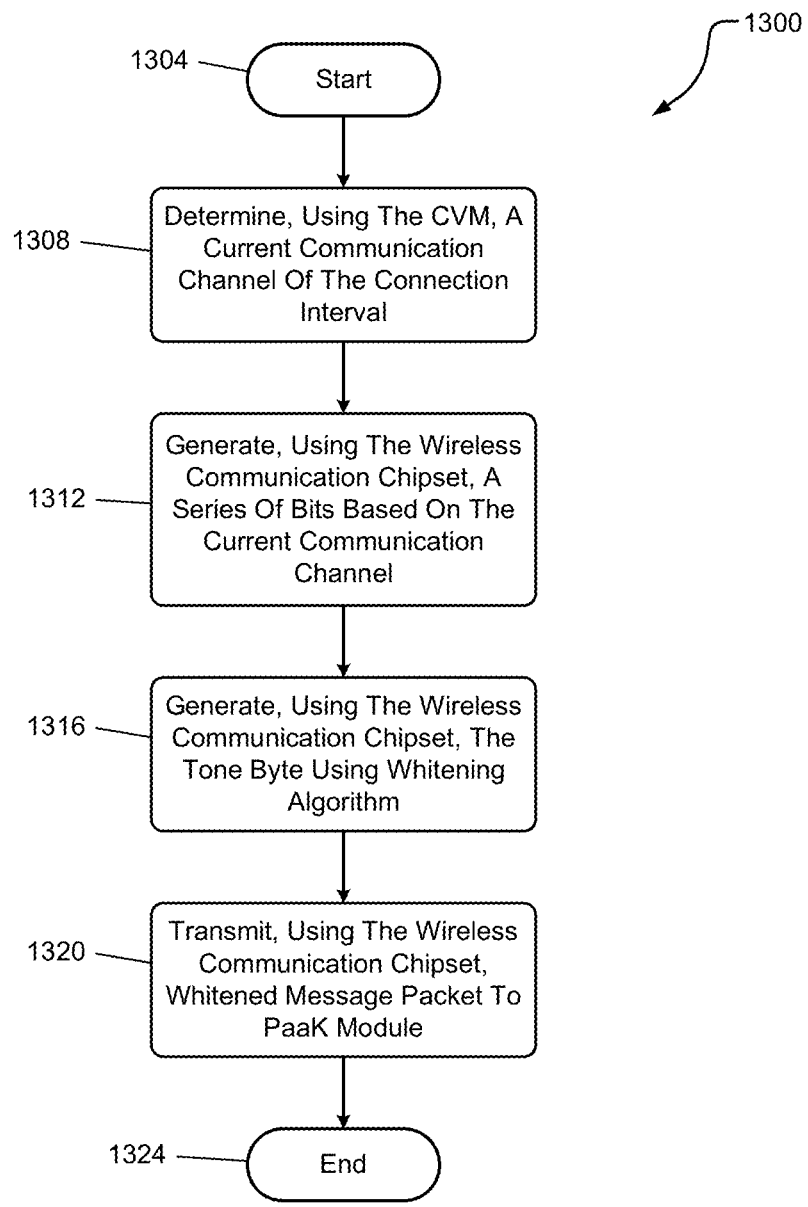

With reference to FIG. 13, a flowchart of a control method 1300 illustrating the transmission of a message packet to the PaaK module 49 is shown. The control method 1300 begins at 1304 when, for example, control method 1200 executes one of steps 1212, 1228, 1236, or 1240. At 1308, the CVM 14 determines a current communication channel of the connection interval (e.g., channel 16 of the BLE protocol). At 1312, the wireless communication chipset 11 generates a series of bits based on the current communication channel of the connection interval.

At 1316, the wireless communication chipset 11 may generate, based on the series of bits, one or more tone bytes using a whitening algorithm. As an example, the wireless communication chipset 11 may include a 7-bit linear feedback shift register (LFSR) circuit with a polynomial of $x^i + x^4 + i$. The LFSR circuit may then apply an XOR function to the series of bits and the message packet 940 in order to generate the tone bytes. In this way, both the function used to determine the tone bytes and the function used by the LFSR circuit to output the sequence of bits used to whiten the message packet 940 are based on the current communication channel. The functions are coordinated so that when the outputted series of bits is XORed with the message packet 940, the resulting whitened message packet includes one or more series of consecutive zeros and/or one or more series of consecutive ones. The whitening process may in effect randomize the bits of the message packet except for the one or more series of consecutive zeros and/or one or more series of consecutive ones. At 1320, the wireless communication chipset 11 transmits the whitened message packet to the PaaK module 49. The method may end at 1324.

FIG. 14 shows a PaaK system 1401 that includes a portable access device 1400, a PaaK device 1402 and one or more readers (two readers 1404 and 1406 are shown). The PaaK device 1402 and the readers may be located within a same vehicle, such as one of the vehicles referred to herein. The portable access device 1400 and/or other portable access devices referred to herein may be referred to as peripheral devices. The PaaK device 1402, portions thereof, and/or other PaaK devices and/or modules referred to herein may be referred to as central devices. The readers 1404, 1406 may be referred to as connection monitor sniffers.

The portable access device 1400 may be configured and/or operate similarly as any of the portable access devices referred to herein and may transmit messages over channels according to a channel hop sequence to the PaaK device 1402. As an example, the portable access device 1400 may include a BLE transceiver 1410, a receive queue 1412, a transmit queue 1414 and a control module 1416. The control module 1416 may include the modules of the CVM 14 of FIG. 9 and perform the operations performed by the modules of the CVM 14 in addition to other operations. The control module 1416 includes a tone de-whiten module 1418, which may generate and insert de-whitened tone bytes as described above and further described below. Messages received from the PaaK device 1402 are stored in the receive queue 1412 until processed by the control module 1416. Messages transmitted to the PaaK device 1402 are stored in the transmit queue 1414 until transmitted to the PaaK device 1402.

As an example, the PaaK device 1402 includes a PaaK sub-system 1403. The PaaK sub-system 1403 may include and/or utilize a BLE transceiver 1420, a receive queue 1422, a transmit queue 1424, and a PaaK module 1426. In one embodiment, portions of the PaaK system 1403, such as the BLE transceiver 1420 and/or the queues 1422, 1424, are located separately from the PaaK device 1402. The PaaK module 1426 may include a tone remover module 1428. The PaaK module 1426 may be configured and/or operate similarly as any of the PaaK modules referred to herein. The tone remover module 1428 may remove tones and/or perform whitening and/or de-whitening operations as described above.

As an example, the readers 1404, 1406 may include BLE receivers 1430, 1440, receive queues 1432, 1442, transmit queues 1434, 1444 and control modules 1436, 1446. The control modules 1436, 1446 may include tone remover modules 1438, 1448. One or more of the readers 1404, 1406 may be referred to as an AoA reader and one or more of the control modules 1436, 1446 may determine angle-of-arrivals (AoAs) of signals transmitted from the portable access device 1400. The AoAs may include AoAs of signals transmitted from the portable access device 1400 and received at the PaaK device 1402, which may be based on known locations of the readers 1404, 1406 relative to the PaaK device 1402 and/or a portion thereof. The readers 1404, 1406 may determine parameters associated with the transmitted signals other than AoAs.

As an example, the readers 1404, 1406 may perform cyclical redundancy check (CRC) operations on the signals transmitted from the portable access device 1400. One or more of the readers 1404, 1406, such as the reader 1406, may not be used for AoA measurements but rather may be used to detect one or more other parameters. As an example, the reader 1406 may be used to perform a cyclical redundancy check (CRC) on messages transmitted between the devices 1400, 1402.

Messages are transmitted between the portable access device 1400 and the PaaK device 1402. The messages are transmitted in sets during allotted connection event periods of connection intervals. During each connection event, messages are transmitted to and from each of the devices 1400, 1402. Examples of this transmission are shown in FIGS. 15-19. Each connection event may be associated with a different channel. As an example, the devices 1400, 1402 may transmit messages according to a channel hop sequence during which the devices 1400, 1402 hop between a predetermined number of preselected channels and transmit and receive messages on each of the channels. The channel hop sequence is a predetermined order of the selected channels.

The modules 1416, 1426, 1436, 1446 and/or the BLE transceivers 1410, 1420, 1430, 1440 control message transmission timing and loading and unloading of the queues 1412, 1414, 1422, 1424, 1432, 1434, 1442, 1444. The queues 1412, 1414, 1422, 1424, 1432, 1434, 1442, 1444 may be monitored by the modules 1416, 1426, 1436, 1446 in order to predict which messages are transmitted during which connection events and on which channels. This allows the control module 1416 to select which messages to include de-whitened tones. By selecting which messages to include de-whitened tones, the control module 1416 selects which messages are able to be captured by the readers 1404, 1406 as part of AoA in-phase and quadrature-phase (IQ) streams.

In one embodiment, the control module 1416 and the PaaK module 1426 meter (e.g., monitor, control, and regulate) BLE generic attribute profile (GATT) characteristics that are caused to be transmitted during connection events and may be included in the stated messages. The BLE GATT characteristics are indicative of how the devices 1400, 1402 transmit data back and forth using services and BLE characteristics. An attribute protocol (ATT) may be used. The BLE GATT characteristics include attribute (or parameter) types and contain logical values. The BLE GATT characteristics may be encapsulated data points and include universally unique identifiers (UUIDs). The metering is performed such that the control module 1416 and the PaaK module 1426 are able to predict which connection events are used for transmission of the BLE GATT characteristics.

Figure 15:
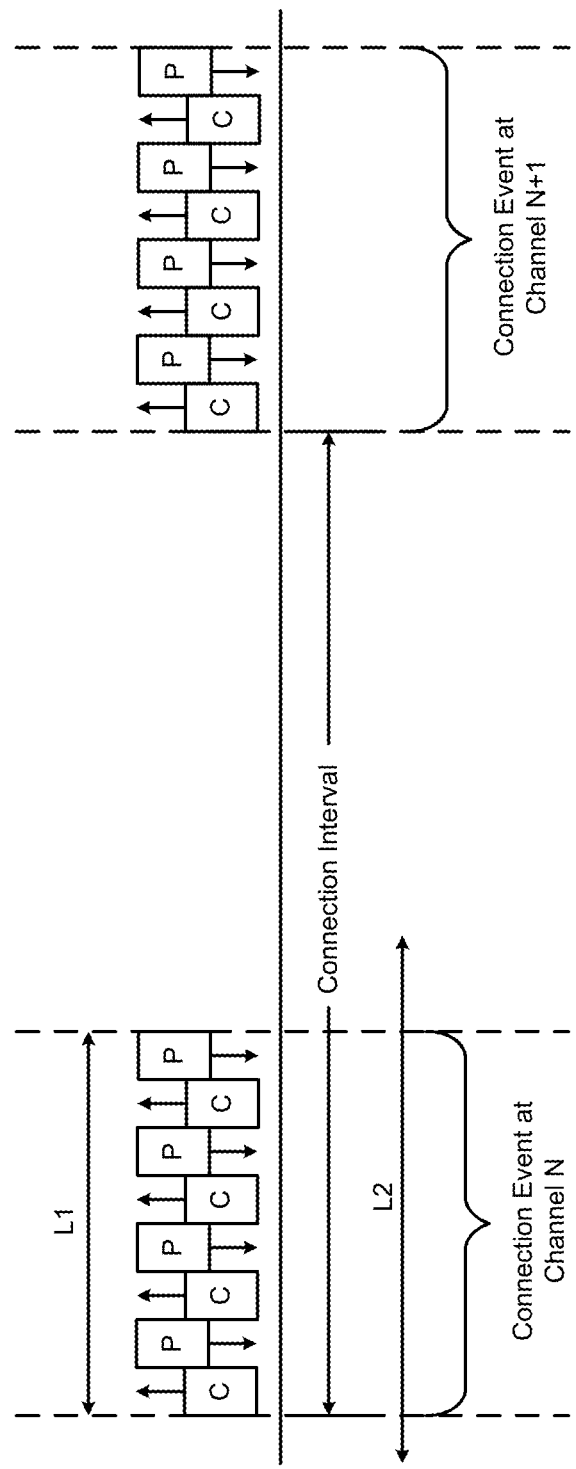
FIG. 15 is an example message timing diagram illustrating a connection length and timing of portable access device messages and PaaK device messages transmitted in a channel hopping sequence in accordance with the present disclosure.

FIG. 15 shows a message timing diagram illustrating a connection length L1 and timing of messages transmitted between and by the portable access device 1400 and the PaaK device 1402 of FIG. 14 according to a channel hopping sequence. The PaaK device 1402 transmits messages (or packets) C to the portable access device 1400 and the portable access device 1400 responds by transmitting messages (or packets) P to the PaaK device 1402. Each connection event is associated with a particular channel and includes a predetermined number of P messages and a corresponding same number of C messages.

The control module 1416 and the PaaK module 1426 may operate according to predetermined protocols and/or rules, referred to as high-level design constraints. For example, the length of time a connection event is open, represented as L2, is the same or longer than a length of time L1 it takes to transmit the messages of that connection event. In one embodiment, L2 is greater than L1. As another example, during each connection event, the number of bytes and the number of messages transmitted from the PaaK device 1402 should be equal to or approximately the same as the number of bytes and number of messages transmitted from the portable access device 1400.

Depending on the state of the transmission system including the devices 1400, 1402, the number of bytes and/or the number of messages transmitted during a connection event may be changed. As an example, the control module 1416 and the PaaK module 1426 may monitor states of the transmission system including: an estimated location of the portable access device 1400 relative to the PaaK device 1402 and/or relative to the vehicle of the PaaK device 1402; changes in a state of the PaaK device 1402 and/or the vehicle, such as a start button of the vehicle being pushed, and/or other changes; transmission rates of the devices 1400, 1402; fill levels of the queues 1412, 1414, 1422, 1424; amounts of detected data transmission traffic between nearby network devices, and/or other parameters and/or associated state changes. The states may be shared between the devices 1400, 1402 and/or indicated to one or more of devices 1400, 1402 via one or more other network devices, such as via one or more other modules and/or devices of the vehicle.

In an embodiment, the messages C and P are sent as notifications in each direction (to and from each of the devices 1400, 1402). The sender (either device 1400 or device 1402) is not informed when the message went through (i.e. is received) by the receiver (the other one of the devices 1400, 1402). There is no guaranteed delivery of each of the messages. This is done such that noise, which causes messages to fail (i.e. not be received), does not negatively affect timing measurements based on which the control module 1416 and the PaaK module 1426 operate.

The portable access device 1400 may operate as a GATT server, which holds an ATT lookup data and service and characteristic definitions. The PaaK device 1402 may operate as a GATT client, which sends requests to the GATT server. All transactions may be started by the master device (e.g., the GATT client), which receives response from the slave device (e.g., the GATT server). In another embodiment, the portable access device 1400 is implemented as a cellular phone and/or mobile phone and operates as a GATT server and/or GATT client and is able to provide non-guaranteed delivery notifications to the PaaK device 1402, such as the previously described notifications.

The transactions between the devices 1400, 1402 may be based on nested objects referred to as profiles, which each include services and corresponding characteristics of the services. The services may be used to break data up into logic entities, and contain specific chunks of data referred to as characteristics. A service may have one or more characteristics, and each service is distinguishable from other services by means of a unique numeric ID (UUID), which may be either 16-bit (for officially adopted BLE Services) or 128-bit (for custom services). Each of the characteristics may encapsulate a single data point or an array of related data, such as X/Y/Z values from a 3-axis accelerometer, etc. The characteristics are distinguishable by a pre-defined 16-bit or 128-bit UUID. The characteristics may be configured as read and/or write privileges.

Figure 16:
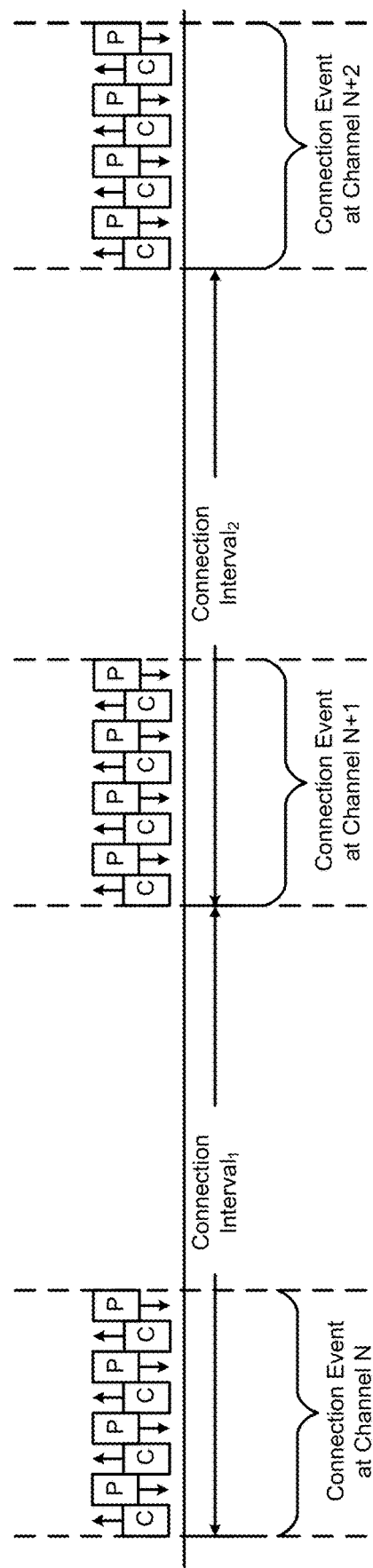
FIG. 16 is an example message timing diagram illustrating connection intervals and a channel hopping sequence in accordance with the present disclosure.

FIG. 16 shows a message timing diagram illustrating connection intervals and a channel hopping sequence. In the example shown, three connection events are shown during which messages C and P are transmitted over respective channels N, N+1 and N+2. Although three connection events are shown, any number of connection events may occur. The messages C and P may be transmitted by the PaaK device 1402 and the portable access device 1400 of FIG. 14.

After the PaaK module 1426 receives each of the P messages, the PaaK module 1426 records which characteristics and channel attempts it detected during the corresponding connection event. The PaaK module 1426 then indicates in a first C message (first notification message) of the next connection event which characteristics and channel attempts were detected during the previous connection event. Each connection event includes transmission of multiple messages (or packets). Each connection event may be associated with transmission of one or more frames. As an example, each connection event may include transmission of a single frame split up among multiple messages (or packets). The PaaK module 1426 may also indicate in the first notification message where the one or more frames are in a sequence of frames being transmitted. The frame sequence may include multiple frames transmitted over multiple connection events and corresponding channels. This process may be iteratively performed for each consecutive pair of connection events.

The control module 1416 of the portable access device 1400 reviews the first notification messages received at the beginning of each connection event and determines what was transmitted and received during the last connection event. This allows the control module 1416 to determine what to transmit in a first P message during the current connection event to the PaaK module 1426. The control module 1416 is able to resend data previously transmitted to, but not received and validated (hereinafter "received") at the PaaK module 1426.

In one embodiment, the portable access device 1400 has up to two connection events worth of lag. The control module 1416 may time the connection events in order to detect when the control module 1416 missed a connection event request from the PaaK module 1426 and send to the PaaK module 1426 the correct messages (or notifications) during a next connection event. This may be done independent of whether the PaaK module 1426 provides an update to the control module 1416 indicating the connection event missed. The control module 1416 may send the correct messages when the control module 1416 does not receive an update from the PaaK module 1426.

In one embodiment, the control module 1416 may generate and send messages including de-whitened tones. As an example, during the three connection events, the control module 1416 may transmit 1-3 de-whitened packets; one for each connection event. This may be done, for example, when there is jitter in control loop performance. One or more control loops may be implemented. A control loop may be implemented to prevent sending too many non-empty PDUs from the PaaK module 1426 to the control module 1416 as a result causing the transmit queue 1424 of the PaaK module 1426 to fill and preventing the portable access device 1400 from sending all of the intended notifications it would normally send and/or a predetermined number of notifications intended to be sent. Another control loop may be implemented to prevent sending too many characteristic PDUs from the control module 1416 to the PaaK module 1426 as a result to causing the receive queue 1422 to fill. If the control module 1416 determines that the receive queue 1422 is backing up based on reports from the PaaK module 1426, the control module 1416 may decrease the number of notifications per connection event to maintain the lag in the control loop close to 2 connection events. Yet another control loop may be implemented where the control module 1416 determines which connection event and channel are next and generates de-whitened packets based on which connection event and channel are next. Each of the de-whitened packets may include one or more de-whitened tones.

The decisions of the above-stated control loops may be made at the PAD 1400 or at the PaaK device 1402. The control loop decisions involve information that may be made available to the control module 1416 and/or the PaaK module 1426. The control module 1416 may schedule an operating system (OS) event that allows the control module 1416 to detect and act on a missing message from the PaaK module 1426. This is done on one side of a control loop, meaning the portable access device 1400, based on the missing message, determines the data previously sent and not received and/or data simply not transmitted and sends the missing data in a next message to the PaaK module 1426. The throttling (or metering) operations described above may be performed on either side of the control loop, meaning at the portable access device 1400 and/or at the PaaK device 1402.

In one embodiment, the PaaK module 1426 determines start and/or end times of connection events and where each connection event is in a channel hop sequence. The C and/or P messages may indicate, during a connection event, where the C and P messages are placed relative to other C and P messages of the connection event. The C and/or P messages may also or alternatively indicate where the corresponding connection event is in the channel hop sequence. This information may be determined by the PaaK module 1426 and shared with the control module 1416. The PaaK module 1426 informs the control module 1416 (i) where the PaaK module 1426 is in the channel hop sequence relative to where in the channel hop sequence the PaaK module 1426 is targeting to be at, and (ii) what are the upcoming (or future) channel connection hops.

In one embodiment, the start and end times of a connection event and where a connection event is in a channel hop sequence allow the PaaK module 1426 to determine by way of data and/or timing what transmitted and received characteristics belong with which connection event. The PaaK module 1426 may generate a connection event information score based on characteristics received indicating how a control loop is performing. The connection event information score may, for example, indicate whether the control loop is ahead, centered, or behind. The control loop may be ahead or behind by a fraction of a message. As an example, fractional messages come into play when the control module 1416 attempts transmission on multiple speculative channels per connection event. The PaaK module 1426 may repetitively generate a message indicating the connection event information score and/or other message and load in the transmit queue 1424 for transmission to the control module 1416. In one embodiment, the PaaK module 1426 empties the receive queue 1422 per connection event.

Figure 17:
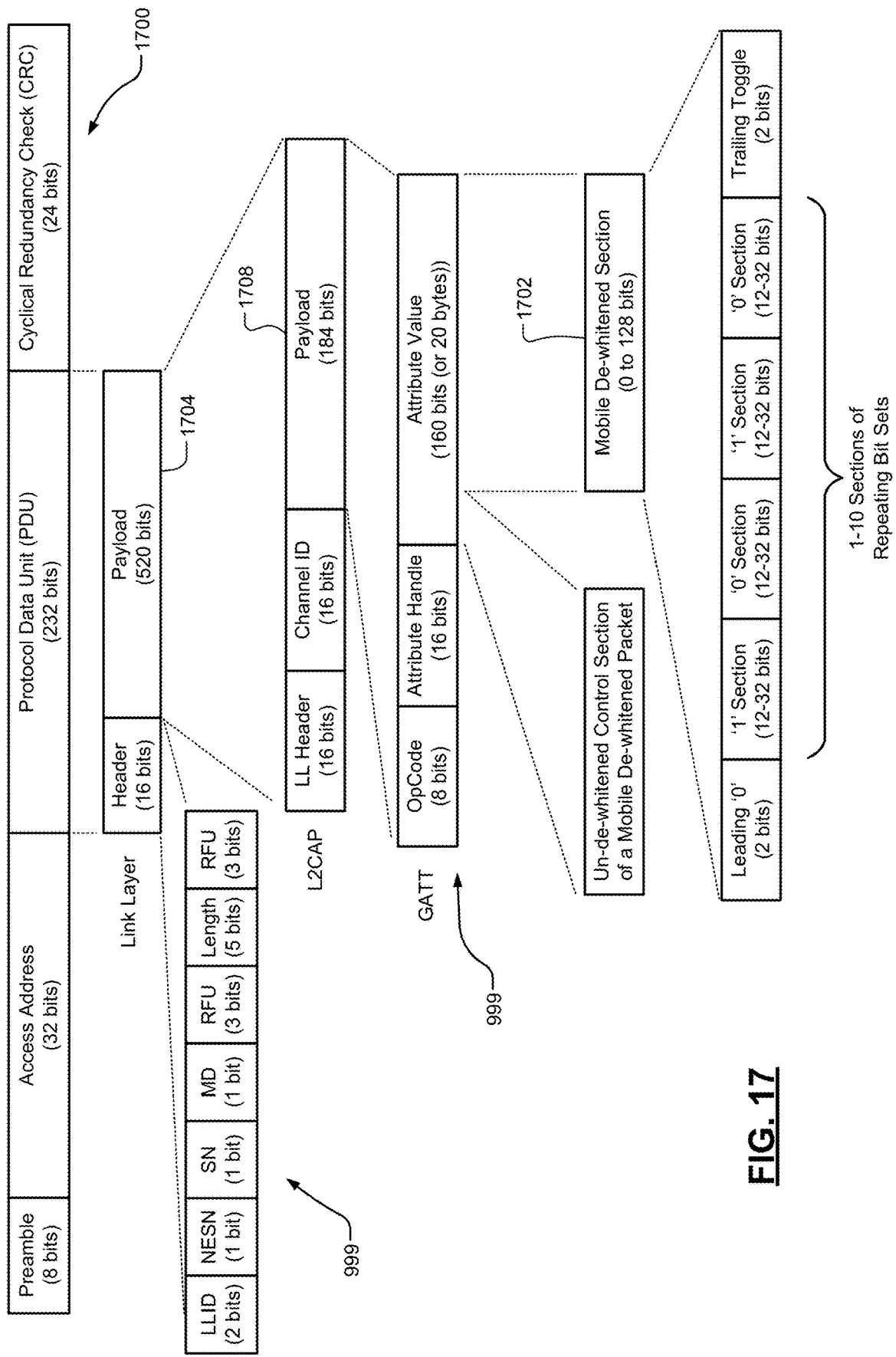
FIG. 17 is a packet diagram illustrating an example packet including a mobile de-whitened section with different bit sets each of which including consecutive identical bits in accordance with the present disclosure.

FIG. 17 shows a packet diagram illustrating an example packet 1700 including a mobile de-whitened section 1702 with different bit sets each of which including consecutive identical bits. The packet 1700 is an example of including a mobile de-whitened section into a legacy 27-byte PDU payload and a 20-byte GATT characteristic. The packet 1700 may replace the message packet 940 of FIG. 9. Example numbers of bits are provided for the fields of the packet 1700. These numbers are provided as an example and may be different. The mobile de-whitened section 1702 may represent and/or replace one or more tones of other message packets mentioned herein. The packet 1700 includes a preamble, an access address, a PDU and CRC bits. The preamble may include 8 bits. The access address may include 32 bits. The PDU may include 232 bits. The packet 1700 may include 24 CRC bits.

The PDU may include a header with 16 bits and a payload 1704 with 520 bits and be generated in a link layer. In an embodiment, the PDU and the payload 1704 do not include a message integrity check (MIC) byte when mobile de-whitening is performed. This is unlike a traditional PDU that typically includes a MIC byte.

The header includes logical link identifier (LLID) bits, a next expected sequence number (NESN) bit, a sequence number (SN) bit, a more data (MD) bit, length bits, and bits that are reserved for future use (RFU). The payload 1704 may be associated with a logical link control and adaptation protocol (L2CAP) and includes a logical link (LL) header, a channel ID and a payload 1708. The LL header includes 16 bits. The channel ID includes 16 bits. The payload 1708 includes 184 bits. The payload 1708 is a GATT and includes an opcode, an attribute handle, and an attribute value. The opcode includes 8 bits. The attribute handle includes 16 bits. The attribute value includes 160 bits (or 20 bytes).

The attribute value includes (i) an un-de-whitened control section of a mobile de-whitened packet, and (ii) the mobile de-whitened section 1702. The un-de-whitened control section may include 32-160 bits. The mobile de-whitened section 1702 includes 0-128 bits. When the mobile de-whitened section 1702 includes 128 bits, 32 bits are left for other data in the corresponding characteristic. The 32 bits may indicate which channel the control module 1416 of the portable access device 1400 is attempting to transmit on and during which connection event the control module 1416 is attempting to transmit. The 32 bits may indicate which fractional PDU per connection event the packet 1700 is associated with and/or for which channel the packet 1700 is de-whitened.

The mobile de-whitened section 1702 may include a leading zero section, a predetermined number of series of same consecutive bits, and a trailing toggle field. The leading zero section may include two zero bits. In one embodiment, the predetermined number of series includes 1-10 series of same consecutive bits, where each series include all zeros or all ones. In one embodiment, each series includes 12-32 bits. The trailing toggle field may include 2 bits. The mobile de-whitened section 1702 may be implemented in a PHY module transmitting at 1 mega-bit per second (Mb/s).

With references to FIGS. 14 and 17 and in an embodiment, one or more of the control modules 1436, 1446 of the readers 1404, 1406 perform an IQ capture based on the access address, the LLID, the LL header, the channel ID, the GATT opcode, the attribute handle of the packet 1700 and/or a subset thereof. One or more of the readers may provide data bits of a received message including the un-de-whitened control section of the de-whitened packet. The PaaK module 1426 may execute software for packets used to capture flow from a BLE stack associated with the PaaK module 1426 to the control modules 1436, 1446 and/or a BLE micro-stack of the readers 1404, 1406. A backchannel may exist between the PaaK module 1426 and the control modules 1436, 1446 for the transfer of fields and/or parameters, such as the access address (address of portable access device), LLID, LL header, channel ID, GATT opcode, attribute handle, AoA, and/or CRC check information.

Figure 18:
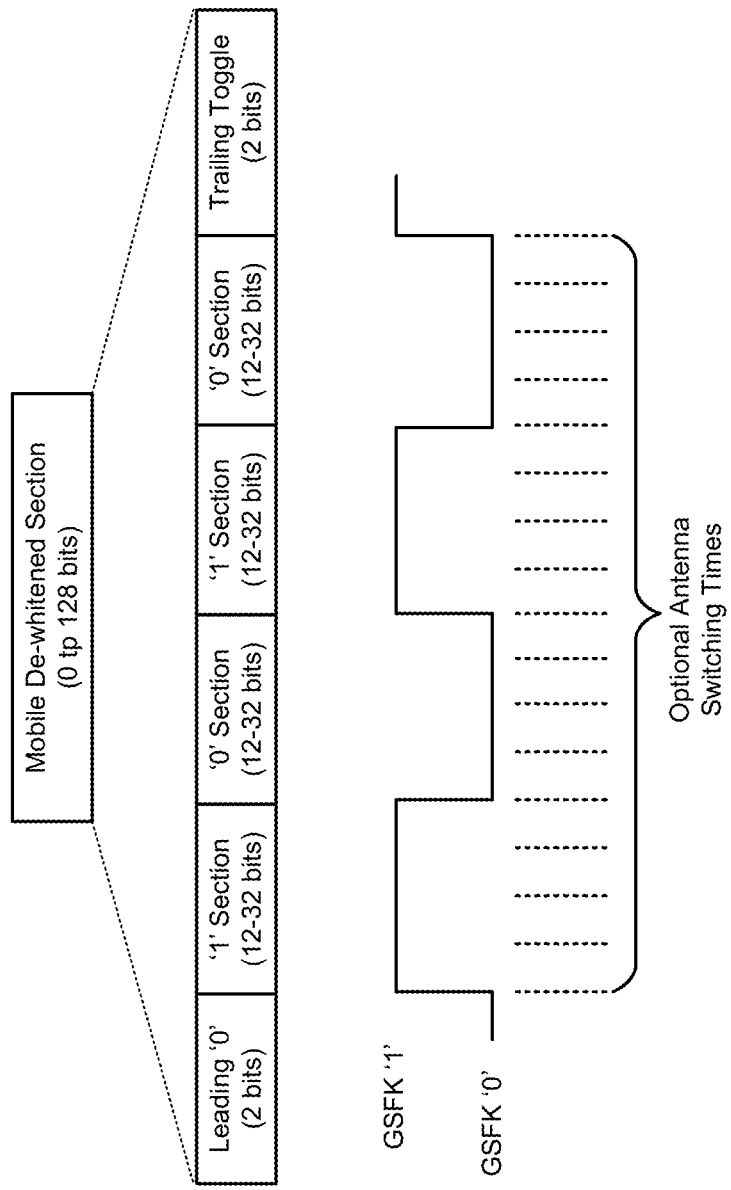
FIG. 18 is a de-whitened section diagram illustrating antenna switching timing in accordance with the present disclosure.

FIG. 18 shows a de-whitened section diagram illustrating example timing of antenna switching. Antenna switching may be performed at and/or for one or more of the readers 1404, 1406 of FIG. 14. A Gaussian frequency shift keying (GFSK) signal is shown having rising and falling edge timing aligned with beginning and end times of the series of consecutive bits of the mobile de-whitened section. The GFSK signal transitions between a '0' state and a '1' state. The GFSK signal may represents a bit stream out of a GFSK modulator of a transceiver transmitting the packet 1700.

In one embodiment, antenna switching is permitted at the rising and falling edges of the GFSK signal. Switching may also occur at other times, such as between the rising and falling edges as shown. The shown vertical dashed lines indicate possible antenna switching times. In one embodiment, at least some of the antenna switching occurs at the rising and falling edges of the GFSK signal.

With reference to FIG. 17, in one embodiment, an empty PDU transmitted by the PaaK module 1426 may take 80 microseconds (μs). When the PDU includes 216 payload bits, the PDU takes 296 μs. In an embodiment, the mobile de-whitened section has at least 72 bits after 32 bits of the access address. As a result, the receiver has 104 bits to stabilize on the transmitter.

In an embodiment, the reader 1404 of FIG. 14 performs antenna switching and the PaaK device 1402 and the reader 1406 do not perform antenna switching. In another embodiment, the control module 1436 captures CRC values when antenna switching occurs. The control module 1436 may perform a CRC check based on data that includes a pre-known de-whitened value. The PaaK module 1426 determines a CRC value associated with a received mobile de-whitened packet and if the CRC value is not within a predetermined range, then the corresponding packet is deemed invalid and is discarded and/or indicated as not being received. The control module 1446 similarly determines a CRC value associated with a received mobile de-whitened packet and if the CRC value is not within a predetermined range, then the corresponding packet is deemed invalid and is discarded and not used.

In one embodiment, a maximum number of consecutive identical bits in the mobile de-whitened section of FIG. 17 is limited to maintain a low bit error rate and allow for a valid CRC level. As an example, for a PaaK device 1402 operating with a 1 Mbit/s PHY module and receiving packets with the mobile de-whitened section being at least 72 bits after an access address (e.g., 32 bit access address), the maximum number may be 12-32 consecutive identical bits while maintaining a signal-to-noise ratio (SNR) of greater than 20 decibels (db). As another example, a list of access addresses, channel IDs, GATT opcodes, and GATT attributes may be preselected such that certain aspects are satisfied for a reader (e.g., one of the readers 1404, 1406) performing antenna switching and receiving packets with the mobile de-whitened section being at least 72 bits after an access address and a SNR of greater than 20 db. The aspects may include: starting antenna switching within a period of a characteristic; performing a CRC check based on a known pattern of mobile de-whitened section bits rather than a switched pattern of bits; and the BLE transceiver of the reader receives a correct (or valid) CRC value after antenna switching.

Antenna switching may be performed to determine angles of arrival of transmitted signals. Examples methods for determining angles of arrival including antenna switching are described in U.S. patent application Ser. No. 16/824,367, filed on Mar. 19, 2020, which is incorporated herein by reference.

FIG. 19 shows packets with possible mobile de-whitened tones transmitted between the portable access device 1400 and the PaaK device 1402. The portable access device 1400 includes the BLE transceiver 1410, the queues 1412, 1414, and the control module 1416 with the tone de-whiten module 1418. The PaaK device 1402 includes the BLE transceiver 1420, the queues 1422, 1424 and the PaaK module 1426. The PaaK module 1426 includes a link authentication module 1900, which may operate similarly as the link authentication module 300 of FIG. 9.

As an example, two connection events are shown, which include transmission of multiple C and P messages. In this example, each connection event includes transmission of four pairs of messages (i.e. 4 C messages and 4 P messages). The connection events may include a different number of pairs of messages than shown. In one embodiment, the first P message is a status non-mobile de-whitened message, which may include status information and/or be used to obtain status information and does not include a mobile de-whitened tone and/or section. The second-fourth P messages of the connection event are de-whitened messages because the messages include de-whitened tones and/or sections. The first P message may be used, for example, to keep a connection between the devices 1400, 1402 open and allow a reader (e.g., one of the readers 1404, 1406 of FIG. 14) to track the connection and capture RSSI values. The P messages are transmitted from the portable access device 1400 to the PaaK device 1402 in response to the respective C messages received from the PaaK module 1426. In one embodiment, some of the P messages include de-whitened tones and/or sections and others of the P messages do not. The captured RSSI values by the readers may be shared with the PaaK module 1426, which may then determine whether the received P messages are valid. When not valid, the PaaK module 1426 may report the invalid P messages as not being received to the portable access device, which may then in following messages resend the data previously sent in the invalidated P messages.

Figure 20:
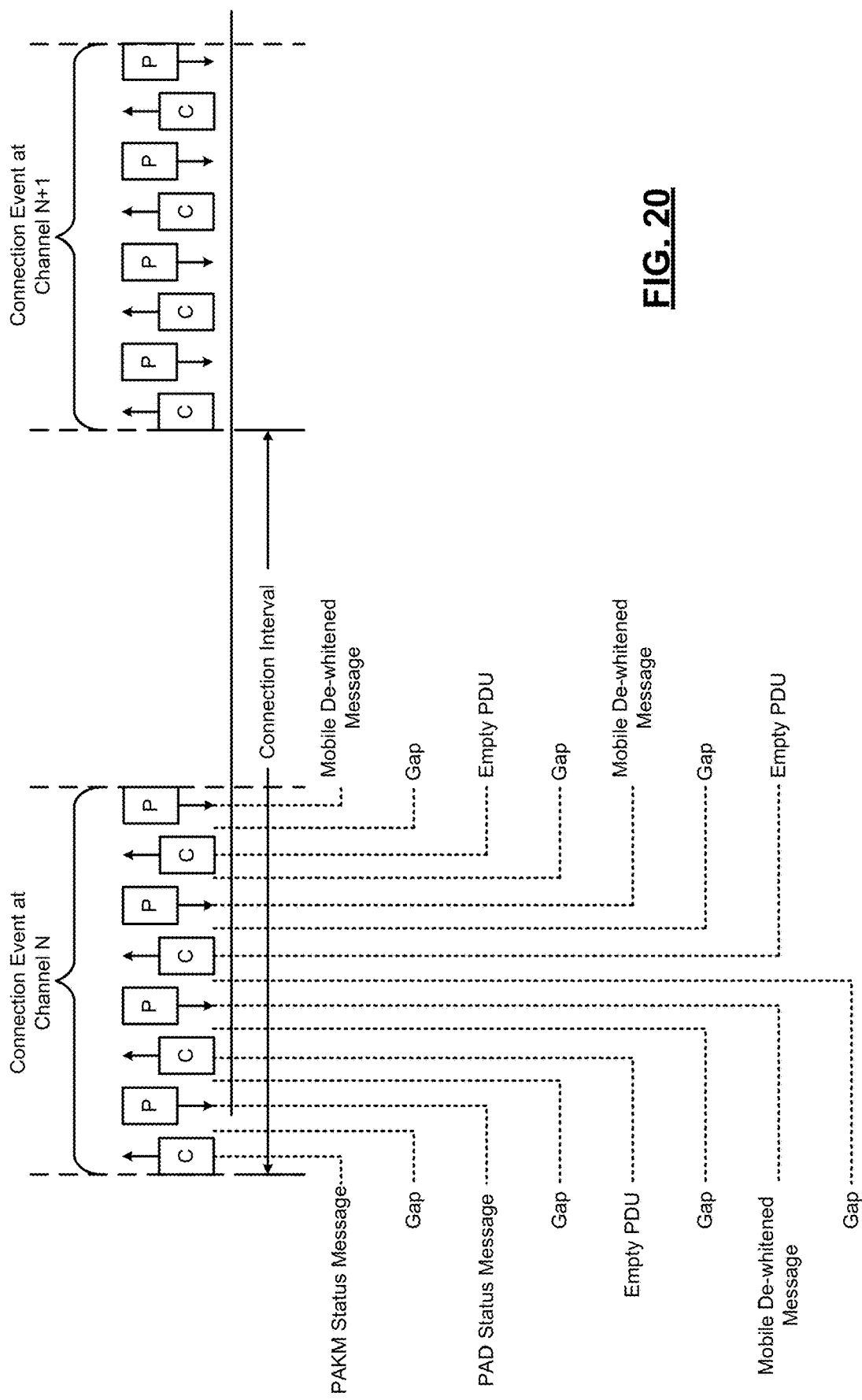
FIG. 20 is a packet diagram illustrating types of messages and corresponding timing included in a connection event in accordance with the present disclosure.

FIG. 20 shows a packet diagram illustrating types of messages and corresponding timing included in a connection event. In this example, four pairs of C and P messages are transmitted in each connection event. The first C message is a status message indicating to the portable access device 1400 of FIG. 14, what data was last received at the PaaK module 1426 from the portable access device 1400 in a last connection event. The first P message is a status message that may indicate to the PaaK module 1426 status information and/or be transmitted to allow readers to obtain status information as described above. The second-fourth C messages are empty PDU messages and the second-fourth P messages are mobile de-whitened messages. An empty PDU includes As an example, an empty PDU message may include 8 preamble bits, 32 access address bits, 16 PDU header bits, 0 payload bits and 24 CRC bits, which may take 80 μs of transmission time. The other messages with full payloads and 160 bits of attribute value may include 8 preamble bits, 32 access address bits, 232 PDU bits and 24 CRC bits and have a transmission time of 296 μs. There may be a 150 μs gap between each C and P message as shown, such that a total amount of time to transmit the C and P messages of a single connection event is 2270 μs (or 296*5+80*3+150*7).

With reference to FIG. 14 and in an embodiment, the above-described metering, notifications, and timing is performed such that events on the PaaK module 1426 and the control modules 1436, 1446 correspond to (e.g., aligned in time, are close in time, and/or are time correlated with) opening and closing (or starting and ending) of connection events. This is done to allow mobile de-whitening as described herein to work and provide guidance to the portable access device 1400 as to how many packets the BLE transceiver 1410 is ahead or behind relative to a channel and connection event the control module 1416 is targeting. The events of (or operations performed by) the PaaK module 1426 and the control modules 1436, 1446 also correspond to (e.g., aligned in time, are close in time, and/or are time correlated with) when characteristics are transmitted from the portable access device 1400 to the PaaK device 1402. This includes the PaaK module 1426 and the control modules 1436, 1446 knowing the channel hop sequence and where the portable access device 1400 is in the channel hop sequence.

In an embodiment, the control module 1416 may fully empty the receive queue 1412 by the end of each connection event. In another embodiment, one or more of the PaaK module 1426 and the control modules 1416, 1436, 1446 may fully empty one or more of the queues 1412, 1414, 1422, 1424, 1432, 1434, 1442, 1444 by the end of each connection event. In one embodiment, when characteristics (i.e. BLE characteristics) are being transmitted, the number of packets stored in the transmit queues 1414, 1424, 1434, 1444 are limited to keep the corresponding one or more control loops quick and small. As described, the PaaK module 1426 and the control modules 1416, 1436, 1446 know start and stop times of connection events, when messages are transmitted and received relative to the connection events, and the channel hop sequence. The PaaK module 1426 and the control modules 1416, 1436, 1446 may also know the frame sequence and/or where the portable access device is in the frame sequence.

FIG. 21 shows an antenna system 2100 for selecting and switching between antennas. The antenna system 2100 includes antennas 2102, a switch 2104 and a radio receiver 2106 (one of the BLE receivers referred to herein). The radio receiver 2106 selects one of the antennas from which to receive a signal via the switch 2104. The antenna system 2100 may be implemented in any of the systems and/or devices disclosed herein.

The antenna system 2100 is implemented in a PaaK AOA system and implements BLE AOA data reception. A portion of a BLE, radio packet received by one of the antennas 2102 may include a continuous wave (OW) tone. The radio receiver 2106 samples the OW tone to provide a quadrature analytical signal, meaning two sinusoids with a 90° phase difference referred to as in-phase and quadrature-phase signals (I and Q signals). The I and O signals are simultaneously sampled and may be combined to form a complex analytical sample, r, where $r=iI+Q$ and i is the imaginary constant, $i=\sqrt{2}$. The data that is received is therefore sliced into interleaved samples from each of the antennas with multiple repetitions.

The present disclosure includes a portable access device for wirelessly gaining access to a vehicle is provided. The portable access device includes a transceiver, receive and transmit queues, and a control module. The transceiver is configured to, during a current connection event, receive first notification messages from a phone-as-a-key (PaaK) system of the vehicle and in response thereto transmit second notification messages to the PaaK system. The first notification messages and the second notification message are transmitted to establish a communication link between the portable access device and the PaaK system. The receive queue is configured to receive the first notification messages. The transmit queue is configured to store the second notification messages. The control module is configured to generate and store the second notification messages in the transmit queue in response to receiving the first notification messages from the receive queue. The control module is configured to, based on a first one of the first notification messages, (i) determine what data was transmitted during a last connection event prior to the current connection event, and (ii) generate one or more of the second notification messages to include data not previously received during the last connection event.

In other features, the second notification messages are associated with one or more frames in a frame sequence. The first one of the first notification messages indicates at least one of characteristics transmitted by the portable access device during the last connection event, channel attempts performed by the portable access device during the last connection event, or where the portable access device is in the frame sequence. The control module generate one or more of the second notification messages to include data not previously received during the last connection event based on the at least one of characteristics transmitted by the portable access device during the last connection event, channel attempts performed by the portable access device during the last connection event, or where the portable access device is in the frame sequence.

In other features, the second notification messages are associated with one or more frames in a frame sequence. The first one of the first notification messages indicates characteristics transmitted by the portable access device during the last connection event, channel attempts performed by the portable access device during the last connection event, and where the portable access device is in the frame sequence. The control module is configured to generate the one or more of the second notification messages based on the characteristics, channel attempts, and where the portable access device is in the frame sequence.

In other features, the first notification messages and the second notification messages are transmitted as 2.4 GHz radio frequency signals.

In other features, the control module is configured to, during the current connection event, limit at least one of (i) a number of characteristics stored in the transmit queue and transmitted to the PaaK system, or (ii) a number of protocol data units stored in the transmit queue and transmitted to the PaaK system. The second notification messages include the characteristics and the protocol data units.

In other features, the control module is configured to: based on one of the first notification messages from the PaaK system, determine that a receive queue of the PaaK system is filling up; and reduce a number of notification messages transmitted from the portable access device to the PaaK system during a connection event subsequent to the current connection event.

In other features, the control module is configured to reduce the number of notification messages transmitted from the portable access device to the PaaK system during the connection event subsequent to the current connection event to maintain a lag in a corresponding control loop to two connection events.

In other features, the control module is configured to generate de-whitened packets to include in some of the second notification messages. The de-whitened packets are generated based on an indication of the current connection event and an indication of a current channel over which the portable access device is transmitting the second notification messages to the PaaK system.

In other features, the control module is configured to generate some of the second notification messages to each include a mobile de-whitened section including a predetermined number of series of consecutive bits. Each of the series of consecutive bits includes all zeros or all ones.

In other features, the predetermined number of series of consecutive bits includes 2-10 series of consecutive bits, where each of the series of consecutive bits includes 12-32 bits.

In other features, the transceiver is configured to receive a connection event information score from the PaaK system indicating whether the portable access device is ahead, centered or behind in transmitting the second notification messages to the PaaK system. The control module is configured to adjust a fill rate of the transmit queue based on the connection event information score.

In other features, a PaaK system for a vehicle is provided. The PaaK system includes a transceiver, a receive queue, a transmit queue and a PaaK module. The transceiver is configured to, during a current connection event, transmit first notification messages to a portable access device and in response thereto receive second notification messages from the portable access device. The second notification messages are associated with one or more frames in a frame sequence. The first notification messages and the second notification message are transmitted to establish a communication link between the portable access device and the PaaK system. The receive queue is configured to receive the second notification messages. The transmit queue configured to store the first notification messages. The PaaK module is configured to generate and store the first notification messages in the transmit queue and generate a first one of the first notification messages to indicate the aspects including at least one of characteristics transmitted by the portable access device during the last connection event, channel attempts performed by the portable access device during the last connection event, or where the portable access device is in the frame sequence.

In other features, the transceiver, the receive queue, the transmit queue, and the PaaK module are implemented as a PaaK device.

In other features, the PaaK module is configured to generate the first one of the first notification messages to indicate: the characteristics transmitted by the portable access device during the last connection event; the channel attempts performed by the portable access device during the last connection event; and where the portable access device is in the frame sequence.

In other features, the PaaK module is configured to: determine what data was received by the PaaK system from the portable access device during the last connection event; and indicate in the first one of the first notification messages what data was received from the portable access device.

In other features, the PaaK system further includes: a tone remover module configured to remove at least one of mobile de-whitened tones or mobile de-whitened sections from the second notification messages; and a validation module configured to determine whether bytes of remaining portions of the second notification messages are valid.

In other features, the PaaK module is configured to limit at least one of a number of non-empty protocol data units stored in the transmit queue or transmitted to the portable access device during the current connection event; and the first notification messages include the non-empty protocol data units.

In other features, the PaaK module is configured to: determine whether the receive queue is filling up; and based on a fill level of the receive queue, indicate in one of the first notification messages a status of the receive queue to cause the portable access device to reduce a number of notification messages the portable access device transmits to the PaaK system during a connection event subsequent to the current connection event.

In other features, the PaaK module is configured to indicate to the portable access device the current connection event and a current channel over which the PaaK system is communicating with the portable access device for generation of de-whitened packets by the portable access device. The second notification messages include the de-whitened packets. In other features, the PaaK module is configured to: generate a connection event information score indicating whether the portable access device is ahead, centered or behind in transmitting the second notification messages to the PaaK module; and store the connection event information score in the transmit queue. The transceiver is configured to transmit the connection event information score to the portable access device.

In other features, a reader is provided and includes a transceiver and a control module. The transceiver is configured to, during a current connection event, monitor notification messages transmitted from a portable access device to a phone-as-a-key (PaaK) system of a vehicle, where the notification messages are transmitted to establish a communication link between the portable access device and the PaaK system. The control module is configured to: perform an in-phase and quadrature phase capture of the notification messages based on fields in one or more of the notification messages, where the fields include a mobile de-whitened section including two or more series of consecutive bits, where the consecutive bits in each of the one or more series are all zeros or all ones; based on the in-phase and quadrature phase capture, determine an angle-of-arrival of the notification messages, and indicate the angle-of-arrival to the PaaK system for permitted access determined by the PaaK system.

In other features, the fields include an access address, a logical link identifier, a logical link header, a channel identifier, a generic attribute profile opcode, and an attribute handle.

In other features, the control module is configured to determine whether to perform the in-phase and quadrature phase capture based on the access address, the logical link identifier, the logical link header, the channel identifier, the generic attribute profile opcode, and the attribute handle.

In other features, the angle-of-arrival is relative to at least one of the reader or a reference point on the vehicle.

In other features, the control module is configured to control the transceiver to perform antenna switching, while determining the angle-of-arrival of the notification messages, based on transmission start and end times of the one or more series of consecutive bits.

In other features, the control module is configured to, while determining the angle-of-arrival of the notification messages, control the transceiver to switch between antennas at (i) a transmission start time of the one or more series of consecutive bits or (ii) a transmission end time of the one or more series of consecutive bits.

In other features, the control module is configured to perform a cyclical redundancy check on the notification messages based on a pre-known de-whitened value.

In other features, the transceiver does not perform antenna switching while the control module determines the angle-of-arrival of the notification messages.

In other features, the control module is configured to perform a cyclical redundancy check on the notification messages and indicate results of the cyclical redundancy check to the PaaK system.

In other features, the control module is configured to control the transceiver to perform antenna switching while determining the angle-of-arrival and while a characteristic is being transmitted from the portable access device to the PaaK system.

In other features, a first one of the notification messages does not include a mobile de-whitened section and other ones of the notification messages include mobile de-whitened sections. The control module is configured to determine a received signal strength indicator value based on the first one of the notification message and indicate the received signal strength indicator to the PaaK system.

In other features, a phone-as-a-key (PaaK) system is provided and includes a transceiver and a PaaK module. The transceiver is configured to, during a current connection event, receive notification messages transmitted from a portable access device, where the notification messages are transmitted to establish a communication link between the portable access device and the PaaK system and gain access to a vehicle, where one or more of the notification messages include fields, where the fields of each of the one or more notification messages include a mobile de-whitened section including two or more series of consecutive bits, and where the bits in each of the one or more series are all zeros or all ones. The PaaK module is configured to: remove the mobile de-whitened section from each of the one or more notification messages; determine whether the notification messages are valid; when the notifications messages are valid, establishing a link with the portable access device; receive angle-of-arrival information from a reader separate from the PaaK system, where the angle-of-arrival information indicates an angle-of-arrival of the notification messages relative to at least one of the reader or a reference point on the vehicle; and providing access to the vehicle to the portable access device based on the angle-of-arrival information.

In other features, the reader performs antenna switching while determining the angle-of-arrival information.

In other features, the reader does not perform antenna switching while determining the angle-of-arrival information.

In other features, the PaaK module is configured to determine whether the notification messages are valid based on a cyclical redundancy check performed by the reader.

In other features, the PaaK module is configured to determine whether the notification messages are valid based on a cyclical redundancy check performed by the PaaK module.

In other features, a first one of the notification messages does not include a mobile de-whitened section and other ones of the notification messages include mobile de-whitened sections. The PaaK module is configured to determine whether one or more of the notification messages are valid based on a received signal strength indicator value received from the reader based on a first one of the notification messages.

In other features, the notification messages are second notification messages. The PaaK module is configured to generate first notification messages and receive the second notification messages from the portable access device in response to the first notification messages. A first one of the first notification messages is a status message and other ones of the first notification messages are empty protocol data unit messages. The first one of the second notification messages is a status message and other ones of the second notification messages are mobile de-whitened messages.

In other features, the PaaK module is configured to indicate to the portable access device whether the portable access device is ahead or behind relative to a channel and connection event the portable access device is targeting.

In other features, the PaaK module is configured to determine (i) when the current connection event starts and stops, (ii) a channel hop sequence of the portable access device, (iii) a frame sequence of the portable access device, (iv) and when the portable access device transmits characteristics, and based thereon control filling a transmit queue of the PaaK system and signal the portable access device to adjust a fill rate of a transmit queue of the portable access device.

In other features, a method is provided for establishing a communication link between (i) a portable access device that includes a processor that is configured to execute instructions stored in a non-transitory computer-readable medium and (ii) a peripheral device is disclosed. The method includes generating, using the processor of the portable access device: first message authentication code (MAC) bytes based on a shared secret key; first nonce bytes; an authenticated packet based on the first MAC bytes, the first nonce bytes, and a message byte; a de-whitened tone byte based on the shared secret key; and a message packet that includes the authenticated packet and the de-whitened tone byte. Generating the message packet includes: pseudo-randomly identifying a first location of the authenticated packet; and inserting the de-whitened tone byte at the first location; transmitting, using the processor of the portable access device, the message packet to the peripheral device; and establishing, using the processor of the portable access device, the communication link between the portable access device and the peripheral device in response to the peripheral device validating the message packet.

In some configurations, the method includes generating, using a processor of the peripheral device, second MAC bytes based on the shared secret key, where the processor of the peripheral device is configured to execute instructions stored in a non-transitory computer-readable medium. The method also includes generating, using the processor of the peripheral device, second nonce bytes.

In some configurations, validating the message packet includes removing, using the processor of the peripheral device, the de-whitened tone byte from the message packet. Validating the message packet also includes determining, using the processor of the peripheral device, that the message packet is authorized in response to the processor of the peripheral device determining that the first MAC bytes match the second MAC bytes.

In some configurations, validating the message packet includes determining, using the processor of the peripheral device, that the message packet is authorized in response to the processor of the peripheral device determining that the first nonce bytes match the second nonce bytes.

In some configurations, the method further comprises determining the message packet is invalid in response to one of: (i) determining, using the processor of the peripheral device, that the first MAC bytes do not match the second MAC bytes; and (ii) determining, using the processor of the peripheral device, that the first nonce bytes do not match the second nonce bytes.

In some configurations, the first nonce bytes are generated using a random number generator.

In some configurations, the first location is between a first MAC bit of the first MAC bytes and a second MAC bit of the first MAC bytes.

In some configurations, the first location is between a first nonce bit of the first nonce bytes and a second nonce bit of the first nonce bytes.

In some configurations, the first location precedes a location of one of the first nonce bytes and the first MAC bytes.

In some configurations, a location of the first nonce bytes and a location of the first MAC bytes precede the first location.

The present disclosure also provides a system that comprises a portable access device that includes a processor configured to execute instructions stored in a non-transitory computer-readable medium. The instructions include generating, using the processor of the portable access device: first message authentication code (MAC) bytes based on a shared secret key; first nonce bytes; an authenticated packet based on the first MAC bytes, the first nonce bytes, and a message byte; a de-whitened tone byte based on the shared secret key; and a message packet that includes the authenticated packet and the de-whitened tone byte. Generating the message packet includes: pseudo-randomly identifying a first location of the authenticated packet; and inserting the de-whitened tone byte at the first location; transmitting, using the processor of the portable access device, the message packet to the peripheral device; and establishing, using the processor of the portable access device, the communication link between the portable access device and the peripheral device in response to the peripheral device validating the message packet.

In some configurations, the peripheral device includes a processor configured to execute second instructions stored in a second non-transitory computer-readable medium. The second instructions include generating, using the processor of the peripheral device, second MAC bytes based on the shared secret key. The second instructions also include generating, using the processor of the peripheral device, second nonce bytes.

In some configurations, validating the message packet includes removing, using the processor of the peripheral device, the de-whitened tone byte from the message packet. Validating the message packet also includes determining, using the processor of the peripheral device, that the message packet is authorized in response to the processor of the peripheral device determining that the first MAC bytes match the second MAC bytes.

In some configurations, validating the message packet includes determining, using the processor of the peripheral device, that the message packet is authorized in response to the processor of the peripheral device determining that the first nonce bytes match the second nonce bytes.

In some configurations, the instructions include determining the message packet is invalid in response to one of: (i) determining, using the processor of the peripheral device, that the first MAC bytes do not match the second MAC bytes; and (ii) determining, using the processor of the peripheral device, that the first nonce bytes do not match the second nonce bytes.

In some configurations, the first nonce bytes are generated using a random number generator.

In some configurations, the first location is between a first MAC bit of the first MAC bytes and a second MAC bit of the first MAC bytes.

In some configurations, the first location is between a first nonce bit of the first nonce bytes and a second nonce bit of the first nonce bytes.

In some configurations, the first location precedes a location of one of the first nonce bytes and the first MAC bytes.

In some configurations, a location of the first nonce bytes and a location of the first MAC bytes precede the first location.

The foregoing description is merely illustrative in nature and is in no way intended to limit the disclosure, its application, or uses. The broad teachings of the disclosure may be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The invention claimed is:

1. A reader comprising:
a first transceiver configured to, during a current connection event, monitor notification messages transmitted from a portable access device to a phone-as-a-key (PaaK) system of a vehicle, wherein the notification messages are transmitted to establish a communication link between the portable access device and the PaaK system, wherein the first transceiver is implemented at the reader and the reader is separate from the portable access device and the PaaK system; and a first control module configured to
perform an in-phase and quadrature phase capture of the notification messages based on a plurality of fields in one or more of the notification messages, wherein the plurality of fields include a mobile de-whitened section including two or more series of consecutive bits, and wherein the consecutive bits in each of the one or more series are all zeros or all ones,
based on the in-phase and quadrature phase capture, determine an angle-of-arrival of the notification messages, and
indicate the angle-of-arrival to the PaaK system for permitted access determined by the PaaK system,
wherein
the PaaK system comprises a second transceiver that receives the notification messages from the portable access device, and
the reader is separate from the second transceiver.

2. The reader of claim 1, wherein the plurality of fields include an access address, a logical link identifier, a logical link header, a channel identifier, a generic attribute profile opcode, and an attribute handle.

3. The reader of claim 2, wherein the first control module is configured to determine whether to perform the in-phase and quadrature phase capture based on the access address, the logical link identifier, the logical link header, the channel identifier, the generic attribute profile opcode, and the attribute handle.

4. The reader of claim 1, wherein the angle-of-arrival is relative to at least one of the reader or a reference point on the vehicle.

5. The reader of claim 1, wherein the first control module is configured to control the first transceiver to perform antenna switching, while determining the angle-of-arrival of the notification messages, based on transmission start and end times of the one or more series of consecutive bits.

6. The reader of claim 1, wherein the first control module is configured to, while determining the angle-of-arrival of the notification messages, control the first transceiver to switch between antennas at (i) a transmission start time of the one or more series of consecutive bits or (ii) a transmission end time of the one or more series of consecutive bits.

7. The reader of claim 1, wherein the first control module is configured to perform a cyclical redundancy check on the notification messages based on a pre-known de-whitened value.

8. The reader of claim 1, wherein the first transceiver does not perform antenna switching while the first control module determines the angle-of-arrival of the notification messages.

9. The reader of claim 1, wherein the first control module is configured to perform a cyclical redundancy check on the notification messages and indicate results of the cyclical redundancy check to the PaaK system.

10. The reader of claim 1, wherein the first control module is configured to control the first transceiver to perform antenna switching while determining the angle-of-arrival and while a characteristic is being transmitted from the portable access device to the PaaK system.

11. The reader of claim 1, wherein:
a first one of the notification messages does not include a mobile de-whitened section and other ones of the notification messages include mobile de-whitened sections; and
the first control module is configured to determine a received signal strength indicator value based on the first one of the notification messages and indicate the received signal strength indicator to the PaaK system.

12. The reader of claim 1, wherein:
the first control module is configured to switch between antennas of the reader while receiving the notification messages;
each of the notification messages include a de-whitening section; and
the first control module is configured to determine the angle-of-arrival based on the de-whitening sections of the notification messages.

13. The reader of claim 12, wherein:
the first control module is configured to switch between the antennas of the reader at transitions between first sections and second sections of each of the de-whitening sections;
the first sections including all ones; and
the second sections including all zeros.

14. The reader of claim 1, wherein:
the PaaK system comprises a PaaK device;
the PaaK device comprises the second transceiver and a second control module;
the second control module receives via the second transceiver the notification messages from the portable access device; and
the reader, comprising the first transceiver and the first control module, is separate from the PaaK device.

15. A phone-as-a-key (PaaK) system comprising:
a first transceiver configured to, during a current connection event, receive notification messages transmitted from a portable access device, wherein the notification messages are transmitted to establish a communication link between the portable access device and the PaaK system and gain access to a vehicle, wherein one or more of the notification messages include a plurality of fields, wherein the plurality of fields of each of the one or more notification messages include a mobile de-whitened section including two or more series of consecutive bits, and wherein the bits in each of the one or more series are all zeros or all ones; and
a PaaK module configured to
remove the mobile de-whitened section from each of the one or more notification messages,
determine whether the notification messages are valid,
when the notifications messages are valid, establishing a link with the portable access device,
receive angle-of-arrival information from a reader, wherein the reader is separate from the portable access device and the PaaK system, wherein the reader comprises a second transceiver that transmits the angle-of-arrival information to the portable access device, wherein the first transceiver is separate from the reader, and wherein the angle-of-arrival information indicates an angle-of-arrival of the notification messages relative to at least one of the reader or a reference point on the vehicle, and
providing access to the vehicle to the portable access device based on the angle-of-arrival information.

16. The PaaK system of claim 15, wherein the reader performs antenna switching while determining the angle-of-arrival information.

17. The PaaK system of claim 15, wherein the reader does not perform antenna switching while determining the angle-of-arrival information.

18. The PaaK system of claim 15, wherein the PaaK module is configured to determine whether the notification messages are valid based on a cyclical redundancy check performed by the reader.

19. The PaaK system of claim 15, wherein the PaaK module is configured to determine whether the notification messages are valid based on a cyclical redundancy check performed by the PaaK module.

20. The PaaK system of claim 15, wherein:
a first one of the notification messages does not include a mobile de-whitened section and other ones of the notification messages include mobile de-whitened sections; and
the PaaK module is configured to determine whether one or more of the notification messages are valid based on a received signal strength indicator value received from the reader based on a first one of the notification messages.

21. The PaaK system of claim 15, wherein:
the notification messages are second notification messages;
the PaaK module is configured to generate first notification messages and receive the second notification messages from the portable access device in response to the first notification messages;
a first one of the first notification messages is a status message and other ones of the first notification messages are empty protocol data unit messages; and
the first one of the second notification messages is a status message and other ones of the second notification messages are mobile de-whitened messages.

22. The PaaK system of claim 15, wherein the PaaK module is configured to indicate to the portable access device whether the portable access device is ahead or behind relative to a channel and connection event the portable access device is targeting.

23. The Paak system of claim 15, wherein the PaaK module is configured to determine (i) when the current connection event starts and stops, (ii) a channel hop sequence of the portable access device, (iii) a frame sequence of the portable access device, (iv) and when the portable access device transmits characteristics, and based thereon control filling a transmit queue of the PaaK system and signal the portable access device to adjust a fill rate of a transmit queue of the portable access device.

24. The reader of claim 15, wherein:
each of the notification messages include a de-whitening section;
antenna switching occurs while the reader is receiving the notification messages; and
the angle-of-arrival information is determined based on the de-whitening sections of the notification messages.

25. The reader of claim 24, wherein:
the antenna switching includes switching between antennas at transitions between first sections and second sections of each of the de-whitening sections;
the first sections including all ones; and
the second sections including all zeros.

* * * * *